US008821973B2

(12) United States Patent
Ito et al.

(10) Patent No.: US 8,821,973 B2
(45) Date of Patent: Sep. 2, 2014

(54) METHOD OF FORMING $FE_{3-x}CR_xO_4$ ($0<X\leq0.1$) FILM ON STRUCTURAL MEMBER IN A PLANT

(75) Inventors: Tsuyoshi Ito, Hitachi (JP); Hideyuki Hosokawa, Hitachinaka (JP); Yukio Hirama, Mito (JP); Makoto Nagase, Mito (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 293 days.

(21) Appl. No.: 13/108,471

(22) Filed: May 16, 2011

(65) Prior Publication Data

US 2011/0277304 A1 Nov. 17, 2011

(30) Foreign Application Priority Data

May 17, 2010 (JP) ................... 2010-112783

(51) Int. Cl.
*B05D 7/22* (2006.01)
*G21C 19/00* (2006.01)
*C23C 18/12* (2006.01)

(52) U.S. Cl.
CPC ............ *G21C 19/00* (2013.01); *C23C 18/1283* (2013.01); *C23C 18/1241* (2013.01); *C23C 18/1216* (2013.01)
USPC .......................................... 427/230; 427/239

(58) Field of Classification Search
USPC .................................................. 427/230–239
See application file for complete search history.

(56) References Cited

U.S. PATENT DOCUMENTS

| 7,811,392 B2 | 10/2010 | Hosokawa et al. |
| 2006/0067455 A1 | 3/2006 | Hosokawa et al. |
| 2008/0075886 A1 | 3/2008 | Nagase et al. |
| 2008/0181351 A1 | 7/2008 | Hosokawa et al. |
| 2009/0003507 A1 | 1/2009 | Nagase et al. |
| 2009/0316852 A1* | 12/2009 | Hosokawa et al. ........... 376/306 |

FOREIGN PATENT DOCUMENTS

| JP | 58-79196 A | 5/1983 |
| JP | 2000-352597 A | 12/2000 |
| JP | 2001-91688 A | 4/2001 |
| JP | 2006-38483 A | 2/2006 |
| JP | 2007-182604 A | 7/2007 |
| JP | 2007-192745 A | 8/2007 |
| JP | 2011-242186 A | * 12/2011 |

OTHER PUBLICATIONS

Yutaka Tamaura, "Ni(II)-Bearing Green Rust II and Its Spontaneous Transformation into Ni(II)-Bearing Ferrites," Bull. Chem. Soc. Jpn., Jun. 1986, pp. 1829-1832, vol. 59, The Chemical Society of Japan.
Masanori Abe, et al., "Ferrite Plating in Aqueous Solution: New Technique for Preparing Magnetic Thin Film," J. Appl. Phys., Mar. 15, 1984, pp. 2614-2616, vol. 55, No. 6, American Institute of Physics.
S.H. Talisa, et al., "FMR Studies of Spin-Spray Ni—Zn Ferrite Films", J. Appl. Phys., Nov. 15, 1988, pp. 5819-5821, vol. 64, No. 10, American Institute of Physics.

\* cited by examiner

*Primary Examiner* — William Phillip Fletcher, III
(74) *Attorney, Agent, or Firm* — Crowell & Moring LLP

(57) ABSTRACT

Both ends of a circulation pipe of a film formation apparatus are connected to a piping of a BWR plant. A chemical including chromium ions and formic acid is injected into a film formation solution flowing in the circulation pipe heated to a temperature within a range from 60° C. to 100° C. Furthermore, a chemical including iron (II) ions and formic acid, hydrogen peroxide, and hydrazine are injected into the circulation pipe. Due to the injection of these chemicals, a film formation solution of pH 7.0 including iron (II) ions, chromium ions, formic acid, hydrogen peroxide, and hydrazine is generated in the circulation pipe. This film formation solution includes hydrazine of, for example, 1000 ppm. The film formation solution is supplied to the piping, thus, a $Fe_{3-x}Cr_xO_4$ film (here, $0<X\leq0.1$) is formed on the inner surface of the piping. The above method of forming the ferrite film on a structural member (for example, the piping) can be shortened time required to form the ferrite film.

19 Claims, 12 Drawing Sheets

METHOD OF FORMING $FE_{3-x}CR_xO_4$ (0<X≤0.1) FILM ON STRUCTURAL MEMBER IN A PLANT

CLAIM OF PRIORITY

The present application claims priority from Japanese Patent application serial no 2010-112783, filed on May 17, 2010, the content of which is hereby incorporated by reference into this application.

BACKGROUND OF THE INVENTION

1. Technical Field

The present invention relates to a method of forming a ferrite film on a structural member composing a plant and, more particularly, to a method of forming a ferrite film on a structural member composing a plant which is suitable to application to a boiling water nuclear power generation plant.

2. Background Art

As a power generation plant, for example, a boiling water nuclear power generation plant (hereinafter, referred to as a BWR plant) and a pressurized water nuclear power generation plant (hereinafter, referred to as a PWR plant) are known. For example, the BWR plant has a nuclear reactor with a core in a reactor pressure vessel (hereinafter referred to as an RPV). Cooling water supplied to the core by a recirculation pump (or an internal pump) is heated by heat generated due to nuclear fission of a nuclear fuel material in fuel assemblies loaded in the core. A part of the heated cooling water becomes steam. This steam is introduced to a turbine from the nuclear reactor and turns the turbine. The steam discharged from the turbine is condensed in a condenser, producing water. This water is supplied to the nuclear reactor as feed water. To suppress generation of radioactive corrosion products in the nuclear reactor, a demineralizer disposed in a feed water pipe mainly removes metal impurities from the feed water.

In a power generation plant such as the BWR plant or PWR plant, a main structural member, with which the cooling water is contacted, such as the reactor pressure vessel, are made of stainless steel or nickel-base alloy to suppress corrosion. Further, for the other structural members such as a reactor water clean-up system, a residual heat removal system, a reactor core isolation cooling system, a core spray system, a feed water system, and a condensate water system, carbon steel members are mainly used in view of reducing the necessary cost of building the plant and of avoiding the stress corrosion cracking of stainless steel caused by high-temperature water flowing in the feed water system and the condensate water system.

Furthermore, since corrosion product, which is origin of a radioactive corrosion product may be generated also from the wetted surface of the RPV and recirculation pipe, for the structural members of the main primary-system, anticorrosive steel, such as less-corrosive stainless steel or nickel-base alloy is used. Further, the RPV made of low-alloy steel has a weld overlay of stainless steel on the inner surface to prevent the low-alloy steel from being come in direct contact with reactor water (cooling water existing in the RPV). The reactor water is cooling water existing in the reactor. Furthermore, a part of the reactor water is purified by a demineralizer in a reactor water clean-up system and metallic impurities slightly existing in the reactor water are removed positively.

In spite of countermeasures against corrosion as described above, it is unavoidable that an extremely small amount of impurities is present in the reactor water. Accordingly, some metal impurities are deposited on the surfaces of fuel rods included in the fuel assemblies as metal oxide. The metallic purities (for example, a metallic element) deposited on the surfaces of the fuel rod cause a nuclear reaction due to irradiation of neutrons generated by nuclear fission of the nuclear fuel material in the fuel rods and become radionuclides such as cobalt 60, cobalt chromium 51, and manganese 54. Most of these radionuclides are kept deposited on the fuel rod surfaces in a form of an oxide. However, some radionuclides are dissolved as ions into the reactor water according to the solubility of the included oxide, and other radionuclides are released again into the reactor water as insoluble solid called crud. The radioactive materials included in the reactor water are removed by the reactor water clean-up system. Radioactive materials that have not been removed circulate in, for example, a recirculation system together with the reactor water. Purina this recirculation, the radioactive materials are accumulated on the surfaces of the structural members composing the BWR plant, where the surfaces are come in contact with the reactor water. As a result, radiation is emitted from the structural member surfaces, causing workers in charge of periodic inspection to be exposed to the radiation. Exposure dose is managed for each worker so that it does not exceed a predetermined value. Recently, predetermined values for the exposure dose have been lowered, causing a need to lower the exposure dose for the each worker as much as possible, in an economical manner.

Therefore, many methods of reducing deposition of radionuclides onto inner surface of pipes (structure members) and many methods of reducing the concentrations of radionuclides in the reactor water are considered. For example, a method of suppressing inclusion of radionuclides such as cobalt 60 and cobalt 58 into the oxide film is proposed (refer to Japanese Patent Laid-open No. 58 (1983)-79196). In this proposed method, for example, metal ions such as zinc ions are injected into the reactor water to closely form an oxide film including zinc on an inner surface of the recirculation pipe, with which the reactor water is come into contact.

Further, Japanese Patent Laid-open No. 2006-3843 (US2006/0067455A) and Japanese Patent Laid-open No. 2007-192745 propose a method of suppressing deposit of radionuclide on surface of a structural member after operation of a nuclear power generation plant by, after chemical decontamination, forming a magnetic film as a ferrite film on the surface of the structural member composing the nuclear power generation plant. In this method, a treatment solution that includes a formic solution including iron (II) ions, hydrogen peroxide, and hydrazine is heated in a range from an ordinary temperature to 100° C., and the heated treatment solution is come into contact with the surface of the structure members whereby a ferrite film is formed on the surface. Furthermore, another method is proposed. In this method, a nickel ferrite film or a zinc ferrite film more stable than the magnetic film is formed on the surface of the structural member composing the nuclear power generation plant and after operation of the plant and thus, deposit, of radionuclides on the surface of the structural member is further suppressed.

To suppress the stress corrosion cracking of the structural member composing the nuclear power generation plant, formation of a composite oxide layer of zinc and chromium in which zinc chromite ($ZnCr_2O_4$) and chromium oxide ($Cr_2O_3$) coexist on the surface of the structural member with which cooling water is come in contact is described in Japanese Patent Laid-open No. 2001-91688.

Japanese Patent Laid-open No. 2000-352597 describes stabilization of Cr included in the structural member composing the nuclear power generation plant. This stabilization of Cr relieves the sensitivity to stress corrosion cracking of the structural member and intends to suppress the corrosion of the structural member. The corrosion suppression can reduce exposure dose during the periodic inspection. Furthermore, Japanese Patent Laid-open No. 2000-352597 proposes that the stabilization of Cr forms a compound in a form of $MCr_2O_4$ (N means one kind of or a mixture of several kinds of Zn, Ni, Fe, and Co) on the surface of the structural member. As a forming method of $MCr_2O_4$, for example, $FeCr_2O_4$ on the surface of the structural member, any one kind or several kinds of the surface processes of plating, coating, lining, flame spraying, prefilming, and grinding are used.

CITATION LIST

Patent Literature

Patent literature 1: Japanese Patent Laid-open No. 58 (1983)-79196
Patent literature 2: Japanese Patent Laid-open No. 2006-38483
Patent literature 3: Japanese Patent Laid-open No. 2007-182604
Patent literature 4: Japanese Patent Laid-open No. 2007-192745
Patent literature 5: Japanese Patent Laid-open No. 2001-91688
Patent literature 6: Japanese Patent Laid-open No. 2000-352597

SUMMARY OF THE INVENTION

Technical Problem

In the nuclear power generation plant, to suppress the progress of stress corrosion cracking, technology of injecting hydrogen into the nuclear reactor is applied. By injecting hydrogen into the cooling water in the nuclear reactor, the technology of hydrogen injection keeps the surface of the structural member composing the nuclear power generation plant, with which the cooling water is come in contact, in the strong reduction environment and suppresses the progress of the stress corrosion cracking in the structural member. Though the technology of the hydrogen injection can suppress the progress of the stress corrosion cracking in the structural member by keeping the surface of the structure member in the strong reduction environment, it is reported that the surface of the structural member is apt to form an oxide film easily taking in $^{60}Co$. Therefore, there is a fear that the exposure dose of workers of the periodical inspection may be increased.

In the method of forming the ferrite film described in Japanese Patent Laid-open No. 2006-38483, Japanese Patent Laid-open No. 2007-182604, and Japanese Patent Laid-open No. 2007-192745 which forms a closely packed ferrite film on the surface of the structural member of the nuclear power generation plant and suppresses the amount of $^{60}Co$ deposition, when forming the ferrite film on the surface of the structural member of the nuclear power generation plant which is a ferrite film-forming object, a solution including iron (II) ions, an oxidizing agent, and a pH adjustment agent are added into the film formation solution being come in contact with the surface of the structural member in the order of the solution including iron (II) ions, oxidizing agent, and pH adjustment agent. Further, Japanese Patent Laid-open No. 2007-182604 describes that those chemicals are added in the order of the oxidizing agent, solution including iron (II) ions, and pH adjustment agent and furthermore, it also describes that those chemicals are added in the order of the solution including iron (II) ions, pH adjustment agent, and oxidizing agent.

The inventors furthermore studied in detail the conventional ferrite film forming method (for example, refer to Japanese Patent Laid-open No. 2007-182604) which is suitable to application to the structural member composing the nuclear power generation plant. As a result, the inventors found that it takes a long time to form a ferrite film.

An object of the present invention is to provide a method of forming a ferrite film on a structural member composing plant, which can shorten the time required to form the ferrite film.

Solution to Problem

The present invention for attaining the above object is characterized in that a film forming solution with pH adjusted within a range from 5.5 to 9.0 including chromium ions, iron (II) ions, an oxidizing agent, and a pH adjustment agent is come in contact with a surface of a structural member composing a plant and an $Fe_{3-x}Cr_xO_4$ film (here, $0<X\leq0.1$) is formed on the surface of the structural member.

Since the $Fe_{3-x}Cr_xO_4$ film (here, $0<X\leq0.1$) is formed on the surface of the structural member, the time required to form the ferrite film including chromium can be shortened.

Preferably, it is desirable that concentration of the pH adjustment agent included in the film forming solution, with which the surface of the plant structural member is come in contact, is adjusted to a concentration within a range larger than 100 ppm and smaller than 50000 ppm.

Advantageous Effect of the Invention

According to the present invention, the time required to form a ferrite film can be shortened.

DETAILED DESCRIPTION OF THE PREFERRED EMBODIMENTS

Figure 1:
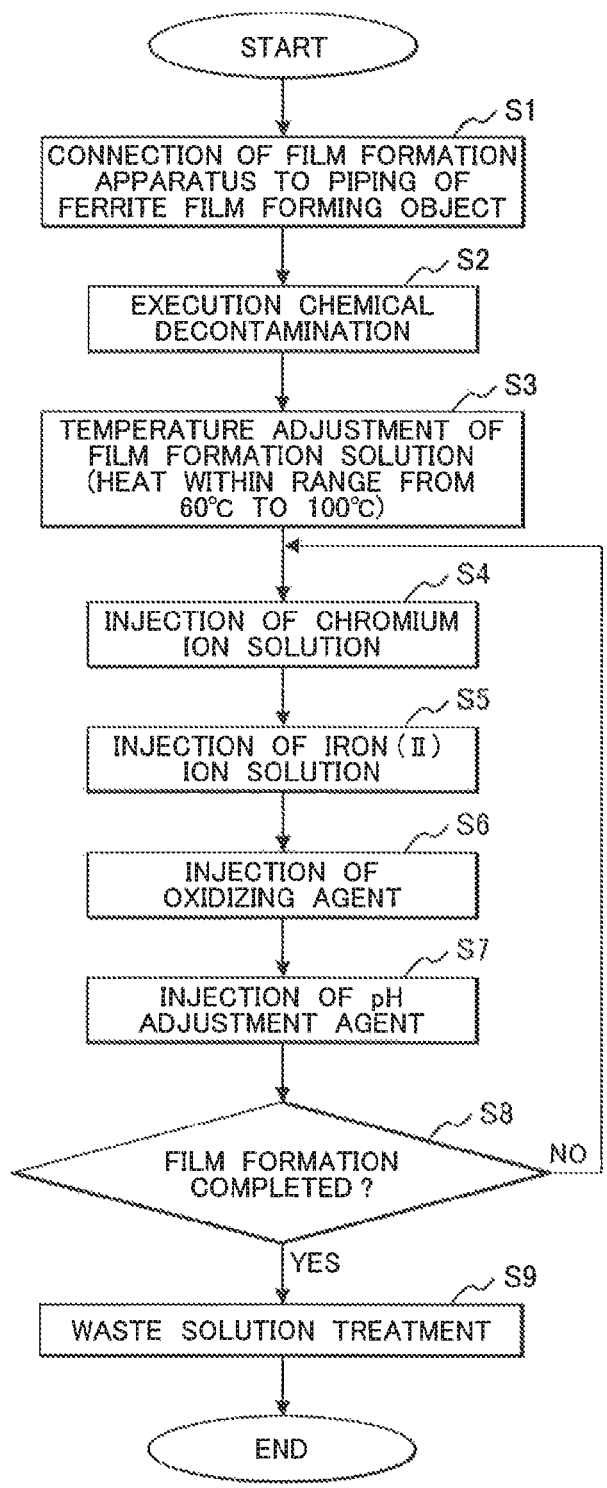
FIG. 1 is a flowchart showing a processing procedure being carried out in a method of forming a ferrite film on a structural member composing a plant according to Embodiment 1 which is a preferred embodiment of the present invention, applied to a recirculation pipe in a BWR plant.

The inventors executed a detailed study in the conventional ferrite film forming method for forming a ferrite film on the surface of the structure member of the nuclear power generation plant in order to find cause of requiring time for film formation. As a result, the inventors found that a slow formation speed of magnetite film is a cause of it. Therefore, the inventors studied variously a method for increasing the film forming speed and as a result, found that when a ferrite film including chromium which is more stable thermodynamically than the magnetite film is formed on the surface of the structural member of the nuclear power generation plant, the film forming speed is increased. Therefore, the inventors studied on a method of forming a ferrite film including chromium on the surface of the structural member.

In Japanese Patent Laid-open No. 2006-36483, Japanese Patent Laid-open No. 2007-162604, and Japanese Patent Laid-open No. 2007-192745, a film formation solution with the pH adjusted within the range from 5.5 to 9.0 including a solution including iron (II) ions, an oxidizing agent, and a pH adjustment agent is come in contact with the surface of the structural member of the nuclear power generation plant and a ferrite film, for example, a magnetite film is formed on this surface. The ferrite film including chromium is a film in which trivalent iron ions of magnetite are replaced with trivalent chromium ions. Therefore, the inventors thought that a film formation solution including a first chemical including chromium ions, a second chemical including iron (II) ions, an oxidizing agent (a third chemical), and a pH adjustment agent (a fourth chemical) is permitted to make contact with the surface of the structural member of the nuclear power generation plant, and thus, a ferrite film including chromium can be formed on the surface of the structural member of the nuclear power generation plant based on reaction of Formula (1)

$$2Cr^{3+}+Fe^{2+}+4H_2O \rightarrow FeCr_2O_4+8H_2 \qquad (1)$$

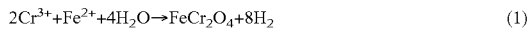

Therefore, the inventors permitted the film formation solution including the first chemical including chromium ions, the second chemical including iron (II) ions, oxidizing agent (the third chemical), and pH adjustment agent (the fourth chemical) to make contact with the surface of a test piece made of stainless steel simulating the structural member made of stainless steel of the nuclear power generation plant and tried by an experiment to form a chromium ferrite ($FeCr_2O_4$) film (hereinafter, the chromium ferrite film is referred to as an $FeCr_2O_4$ film) on one surface of the test piece. However, when the film formation solution is at a temperature of 100° C. or lower, no $FeCr_2O_4$ film can be formed on a surface of the test niece. Even if the aforementioned film formation solution is permitted to make contact with the surface of a test piece made of carbon steel, when the temperature of the film formation solution is 100° C. or lower, similarly, no $FeCr_2O_4$ film can be formed on a surface of the test piece. The reason is that when the temperature of the film formation solution is 100° C. or lower, the thermodynamic energy necessary to form a $FeCr_2O_4$ film on the surface of the structural member composing a plant is insufficient.

This problem arises also when the forming of the $FeCr_2O_4$ film on the surface of the structural member composing the plant by the prefilming disclosed in Japanese Patent. Laid-open No. 2000-352597 is executed by using the film formation solution including the first chemical including chromium ions, the second chemical including iron (II) ions, oxidizing agent (the third chemical), and pH adjustment agent (the fourth chemical). The inventors examined by an experiment to form a ferrite film including chromium on the surface of the structural member composing the plant in a state in which the temperature of the film formation solution being come in contact with the structural member composing the plant is 100° C. or lower.

As a result, if the ferrite film including chromium formed on the structural member is a $Fe_{3-x}Cr_xO_4$ film (here, $0<X\leq0.1$), within the temperature range of 100° C. or lower, the $Fe_{3-x}Cr_xO_4$ film (here, $0<X\leq0.1$) can be formed on the surface of a test piece made of stainless steel or carbon steel, incidentally, a film of $Fe_{2.9}Cr_{0.1}O_4$ when X=0.1 is formed by the reaction of Formula (2).

$$0.1Cr^{3+}+1.9Fe^{3+}+Fe^{2+}+4H_2O \rightarrow Fe_{2.9}Cr_{0.1}O_4+8H_2 \qquad (2)$$

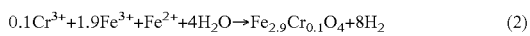

The ferrite film including chromium means the $Fe_{3-x}Cr_xO_4$ film (here, $0<X\leq0.1$) instead of the $FeCr_2O_4$ film.

As a result of the study mentioned above, the inventors thought that when forming a ferrite film including chromium on the surface of the structural member of the nuclear power generation plant, it is desirable to add the first medicine including chromium ions to water and then add the second medicine including iron (II) ions, the third medicine of the oxidizing agent, and the fourth medicine of the pH adjustment agent. The reason is to inject firstly chromium ions and iron (II) ions, before the film format ion solution makes contact with the surface of the plant structural member, mix the chromium ions and iron (II) ions more uniformly in the film formation solution, and in the state that the film formation solution is in contact with the plant structural member, promote adsorption of the chromium ions and iron (II) ions onto the surface or the plant structural member.

When the concentration Ccr of the chromium ions included in the film formation solution satisfies 0<X≤500 ppm, the $Fe_{3-x}Cr_xO_4$ film (here, 0<X≤0.1) can be formed on the surface of the structural member composing the plant. When forming the $Fe_{3-x}Cr_xO_4$ film (here, 0<X≤0.1), even if the temperature of the film formation solution is 100° C. or lower, the thermodynamic energy necessary to form the $Fe_{3-x}Cr_xO_4$ film (here, 0<X≤0.1) on the surface of the structural member composing the plant is supplied sufficiently. The lower limit of the temperature of the film formation solution may be 20° C., though it is preferably 60° C. or higher, which falls within the practical use range of the generation speed of a ferrite film including chromium.

Figure 4:
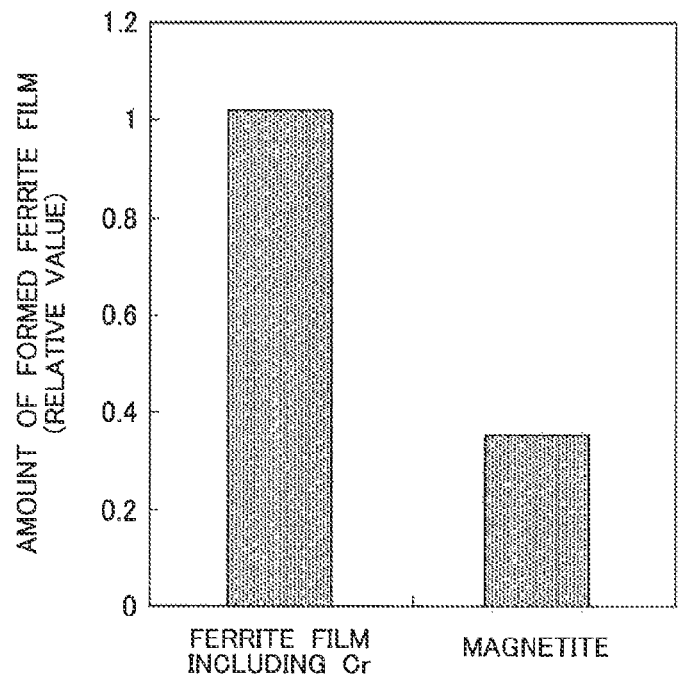
FIG. 4 is an explanatory drawing showing amount of respective film when a magnetic film and a ferrite film including chromium are separately formed on stainless steel members.

The inventors executed that a film formation solution generated by adding the first chemical including chromium ions, second chemical including iron (II) ions, third chemical of the oxidizing agent, and fourth chemical of the pH adjustment agent to water is come in contact with the surface of a test piece made of stainless steel simulating the structural member made of stainless steel of the nuclear power generation plant and thus, a ferrite film including chromium is formed on the surface. The inventors measured the formed amount of the ferrite film including chromium which is formed on the surface of the test piece after film formation. The measured results are shown in FIG. 4. In FIG. 4, a formed amount (a relative value of 0.35) of the magnetite film formed on the surface of another test piece made of stainless steel by the method of forming the ferrite film described in Japanese Patent Laid-open No. 2006-38483 is also shown together with the formed amount (a relative value of 1.02) of the ferrite film including chromium. With respect to the amount (thickness) of the film formed on the surface of the test piece for the same time, the amount of the formed ferrite film including chromium is larger than the amount of the formed magnetite film. Namely, the amount of the film of the former is about 2.91 times the amount of the film of the latter.

A small amount of chromium ions is injected into the film formation solution so that the chromium ion concentration Ccr of the film formation solution satisfies 0<X≤500 ppm, thus the amount of the ferrite film including chromium, that is, the $Fe_{3-x}Cr_xO_4$ film (here, 0<X≤0.1) formed on the surface of the structural member composing the plant is two or more times the amount of the magnetite film formed on the surface of the t structural member composing the plant by the method of forming the ferrite film described in Japanese Patent Laid-open No. 2006-38483. Therefore, the corrosion of the surface of the structural member of the plant and the radioactivity adhesion onto the surface are suppressed.

The ferrite including chromium is stable thermodynamically, so that the deposition amount in the film formation solution is increased compared with magnetite, nickel ferrite, and zinc ferrite, and there are possibilities that the film forming quantity on the surface of the structural member surface may be reduced. Therefore, the inventors studied the method of forming the ferrite film based on the theoretical formula of the film growth speed in order to check whether the aforementioned experimental results are theoretically correct or not. The ferrite growth speed G in the film formation solution can be expressed by a product of a film growth suppression coefficient K and a movement coefficient N (α) of the ferrite including chromium in the film formation solution as shown in Formula (3). Here, the movement coefficient N (α) of the ferrite including chromium is a function of a concentration (α) of the ferrite including chromium. The concentration (α) of the ferrite including chromium is a concentration on the surface of the structural member.

$$G = KN(\alpha) \qquad (3)$$

Namely, the deposition amount of the ferrite in the film formation solution can be suppressed by decreasing an impurity coefficient K. The pH adjustment agent (for example, hydrazine) may be considered as a material (film growth suppression material) for suppressing the growth of the ferrite in the film formation solution. If the (deposition of the ferrite in the film formation solution is not suppressed using the pH adjustment agent and the like, the generation and deposition of the ferrite in the film formation solution are promoted and the formation of the film on the surface of the structural member of the plant where a ferrite film including chromium must be formed, is disturbed. When a material for suppressing the growth of ferrite in the film formation solution, for example, hydrazine is added to the film formation solution, the growth of the ferrite in the film formation solution is suppressed and the ferrite film can be formed easily on the surface of the structural member of the plant.

Figure 5:
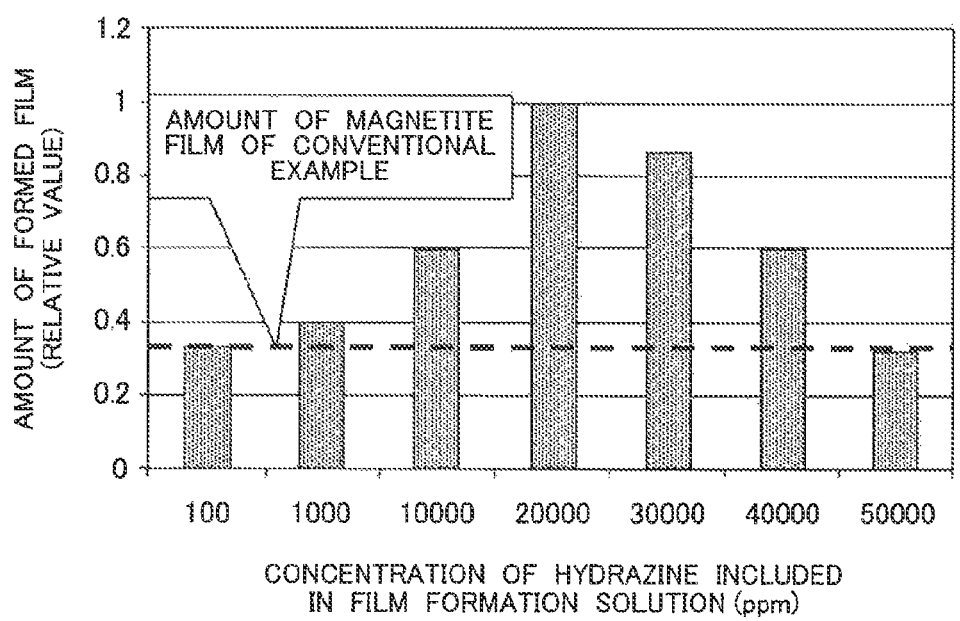
FIG. 5 is an explanatory drawing showing a relation between a total concentration of formic acid and hydrazine included in film forming solution and amount of formed ferrite film including chromium.

Therefore, the inventors obtained a relation between the concentration of the film growth suppression material in the film formation solution, that is the concentration of the pH adjustment agent (for example, hydrazine) and formed amount of the ferrite film including chromium which is formed on the surface of the structural member. The obtained results are shown in FIG. 5. The amount of the formed ferrite film including chromium was maximized when the growth suppression material concentration in the film formation solution (for example, hydrazine concentration) was 20000 ppm. Even when the concentration of the growth suppression material was increased or decreased from 20000 ppm, the amount of the formed film was reduced. When the concentration C of the growth suppression material (the concentration of pH adjustment agent concentration) included in the film formation solution satisfies 100 ppm<C<50000 ppm, the amount of the ferrite film including chromium formed on the surface of the structural member becomes larger than the amount (a relative value of 0.35) of the magnetite film formed on the surface of the structural member by the conventional method of forming the ferrite film described in Japanese Patent. Laid-open No. 2006-38483 Particularly, when the concentration C of the growth suppression material (the concentration of adjustment agent concentration) included in the film formation solution is within the range of 10000 ppm≤C≤fit 40000 ppm, the amount of the ferrite film including chromium formed on the surface of the structural member is increased remarkably.

When 100 ppm<C<50000 ppm is satisfied even by the verification using Formula (3), by the method of forming the ferrite film, using the film formation solution including the first chemical including chromium ions, second chemical including iron (II) ions, third chemical of the oxidizing agent, and fourth chemical of the pH adjustment agent, not only the ferrite film including chromium can be formed but also when 100 ppm<C<50000 ppm is satisfied, the formed amount for the same time is larger than the thickness of the magnetite film formed on the surface of the structural member made of stainless steel which is described in Japanese Patent Laid-open No. 2006-33483. Namely, it means that the time required to form the same amount of the film can be shorted.

Figure 6:
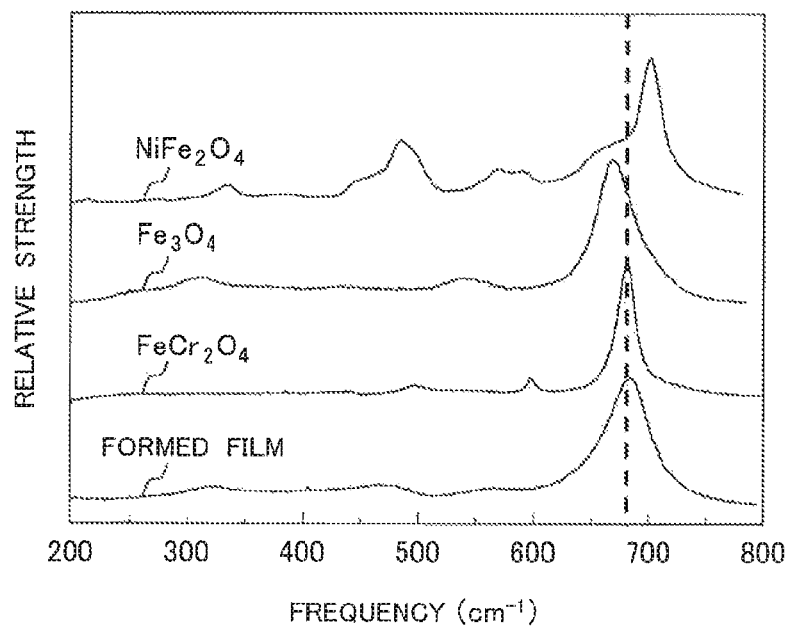
FIG. 6 is an explanatory drawing showing analytical results of a ferrite film including chromium using a Raman spectrum method.

The results of analysis of the composition of the ferrite film including chromium which is formed on the surface of the stainless steel member by the Raman spectrum method, are shown in FIG. 6. In FIG. 6, it can be confirmed that the formed film is a ferrite film including chromium.

Figure 7:
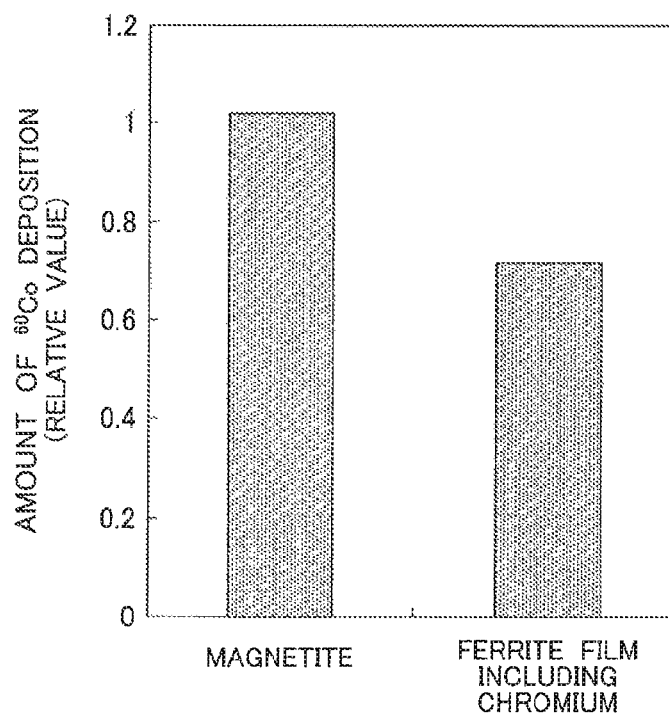
FIG. 7 is an explanatory drawing showing a deposition status of radionuclides on respective stainless steel members on surfaces of which ferrite films including magnetite and chromium are formed separately.
Figure 8:
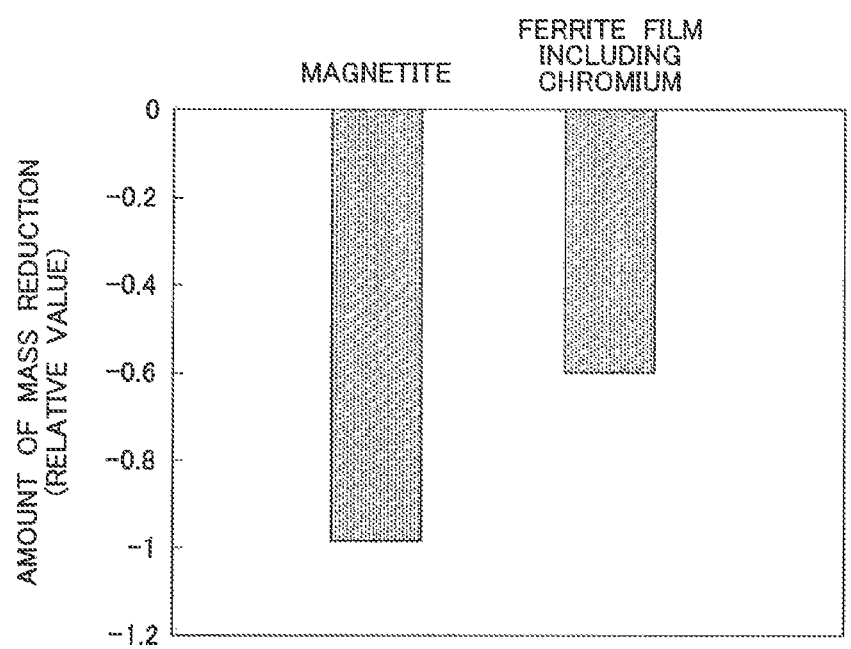
FIG. 8 is an explanatory drawing showing corrosion suppression effect of a stainless steel member on a surface of which a ferrite film including chromium is formed.

The inventors confirmed a corrosion suppression effect and a radionuclide deposition suppression effect of the stainless steel member by an experiment. The radioactivity deposition suppression effect and corrosion suppression effect obtained will be explained by referring to FIGS. 7 and 8. The vertical axis shown in FIG. 7 indicates a relative value of amount of $^{60}$Co deposition. The ferrite film including chromium suppresses the radioactivity deposition more than the magnetite film does. Namely, the radioactivity deposition can be suppressed by to forming the ferrite film including chromium. The vertical, axis shown in FIG. 8 indicates a relative value of weight change of sample. The samples are the test piece forming the magnetite film and the test piece forming the ferrite film including chromium. As shown in FIG. 8, the reduction in weight of the test piece forming the ferrite film including chromium on the surface is smaller than that of the test piece forming magnetite. Namely, the corrosion can be suppressed by forming the ferrite film including chromium.

The embodiments of the present invention reflecting the examination results aforementioned will be explained below.

Embodiment 1

A method of forming a ferrite film on, a structural member composing a plant according to embodiment 1 which is a preferred embodiment of the present invention, applied to a recirculation pipe in a BWR plant will be explained by referring to FIGS. 1, 2, and 3.

Figure 2:
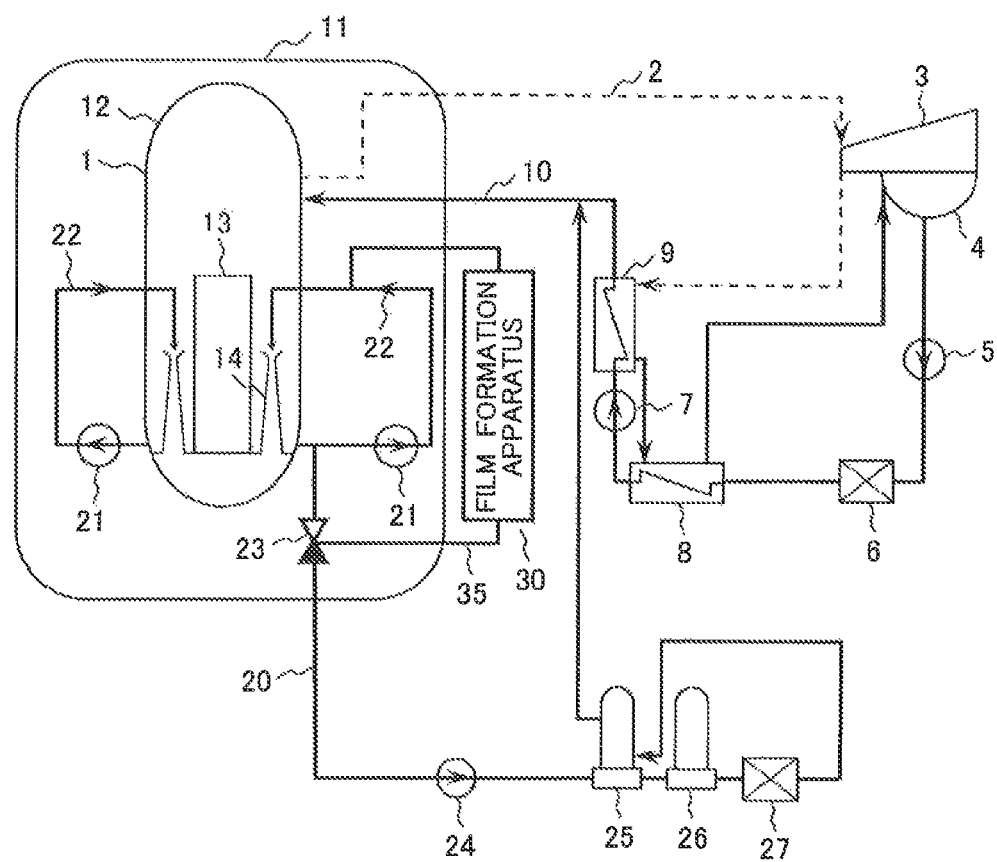
FIG. 2 is en explanatory drawing showing a status in which a film formation apparatus used no execute a method of forming a ferrite film on a structural member composing a plant shown in FIG. 1 is connected to a recirculation pipe in a BWR plant.
Figure 3:
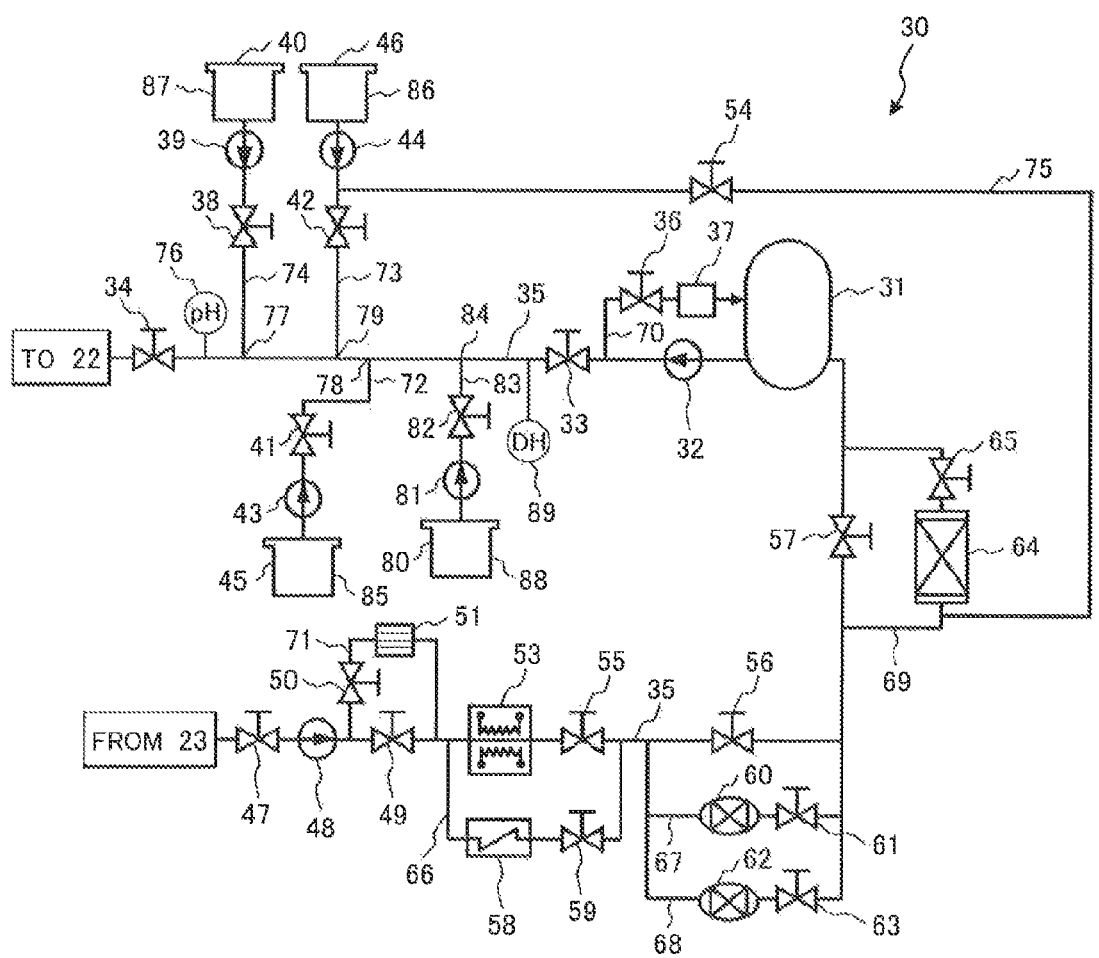
FIG. 3 is a detailed structural diagram showing a film formation apparatus shown in FIG. 2.

As shown in FIG. 2, the BWR plant which is a nuclear power generation plant is provided with a nuclear reactor 1, a turbine 3, a condenser 4, a recirculation system, a reactor clean-up system, and a water feed system, and so on. The nuclear reactor 1 has a reactor pressure vessel (hereinafter referred to as RPV) 12 in which a core 13 is disposed, and jet pumps 14 disposed in the RPV 12, A plurality of fuel assemblies (not shown) are loaded in the core 13. The fuel assembly has a plurality of fuel rods filled with a plurality of fuel pellets made from nuclear fuel material. The recirculation system has a recirculation pipe 22 and a recirculation pump 21 installed to the recirculation pipe 22. In the feed water system, a condensate pump 5, a condensate clean-up apparatus 6, a feed water pump 7, low pressure feed water heaters 8, and high pressure feed water heaters 9 are installed in this order to a feed water pipe 10 communicating with the condenser 4 and the RPV 12. In the reactor clean-up system, a clean-up pump 24, a regenerative heat exchanger 25, a non-regenerative heat exchanger 26, and a reactor water clean-up apparatus 27 are installed in this order to a clean-up system pipe 20 communicating with the recirculation pipe 22 and the feed water pipe 10. The clean-up system pipe 20 is connected to the recirculation pipe 22 upstream of the recirculation pump 21. The nuclear reactor 1 is installed in a primary containment vessel 11 disposed in a reactor building (not shown).

The cooling water in the RPV 12 is pressurized by the recirculation pump 21 and is jetted into the Jet pump 14 through the recirculation pipe 22. The cooling water existing around a nozzle of the jet pump 14 is also sucked into the jet pump 14 and is supplied, to the core 13. The cooling water supplied to the core 13 is heated using the heat generated by nuclear fission of the nuclear fuel material in the fuel rods. A part of the heated cooling water turns into steam. This steam is removed moisture by a steam separator (not shown) and a steam dryer not shown) which are installed in the RPV 12, then is introduced to the turbine 3 from the RPV 12 through a main steam pipe 2, and turns the turbine 3. A generator (not drawn) coupled to the turbine 3 rotates and power is generated.

The steam exhausted from the turbine 3 is condensed to water by the condenser 4. This water is supplied into the RPV 12 through the water feed pipe 10 as feed water. The feed water flowing through the water feed pipe 10 is pressurized by pressure by the condensate pump 5, impurities included in the feed water is removed impurities by the condensate clean-up apparatus 6, and the feed water is further pressurized by the feed water pump 7. The feed water is heated by the low pressure feed water heater 8 and high pressure feed water heater 9 and is introduced into RPV 12. Extracted steam extracted from the turbine 3 is supplied to both low pressure feed water heater 8 and high pressure feed water heater 9 through the extraction pipe and becomes a heat source for feed water.

A part of the cooling water flowing in the recirculation pipe 22 is introduced into the clean-up system pipe 20 of the reactor clean-up system by operation of the clean-up pump 24, and after being cooled by the regenerative heat exchanger 25 and the non-regenerative heat exchanger 26, it is cleaned up by the water clean-up apparatus 27. The cleaned-up cooling water is heated by the regenerative heat exchanger 25 and returned to the RPV 12 through the clean-up system pipe 20 and the feed water pipe 10.

During the operation stop period of the BWR plant after stopping of the operation of the BWR plant, both ends of a circulation pipe (film formation solution pipe) 35 of the film formation apparatus 30 which is a temporary equipment are connected to the recirculation pipe 22 made of stainless steel. The operation of connecting the circulation pipe 35 to the recirculation pipe 22 will be explained in detail. After stopping of the operation of the BWR plant, for example, the bonnet of a valve 23 installed in the clean-up system pipe 20 connected to the recirculation pipe 22 is opened and a portion on the side of the clean-up pump 24 is blocked. One end of the circulation pipe 35 of the film formation apparatus 30 is connected to the flange of the valve 23. By doing this, one end of the circulation pipe 35 is connected to the recirculation pipe 22 on the upstream side of the recirculation pump 21. On the other hand, the branch such as the drain pipe or instrumentation pipe which is connected to the recirculation pipe 22 on the downstream side of the recirculation pump 21 is separated and the other end of the circulation pipe 35 of the film formation apparatus 30 is connected to the separated branch. Both ends of the circulation pipe 35 are connected to the recirculation pipe 22, thus a closed loop including the recirculation pipe 22 and circulation pipe 35 is formed. Each opening in the RPV 12 at both ends of the recirculation pipe 22 is blocked by a plug (not drawn) so as to prevent the film formation solution from flowing into the RPV 12. The film formation apparatus 30 is removed from the recirculation pipe 22 after the ferrite film including chromium was formed on the inner surface of the recirculation pipe 22 and the processing of the film formation solution used for forming the ferrite film was finished and during the operation stop period of the BWR plant. The operation of the BWR, plant is started after the film formation apparatus 30 was removed from the recirculation pipe 22.

The film formation apparatus 30 is used for both of formation of the ferrite film including chromium on the inner surface of the recirculation pipe 22 and processing of the film formation solution used for formation of the film. Furthermore, the film formation apparatus 30 is used also for chemical decontamination of the inner surface of the recirculation pipe 22. The film formation apparatus 30 connected to the recirculation pipe 22, in the BWR plant, is disposed in the reactor containment vessel 11 which is a radiation controlled area.

In the present embodiment, though the recirculation pipe 22 is used as a film-forming object, each piping of the wafer feed system, reactor clean-up system, and component cooling water system may housed as a film-forming object. The circulation pipe 35 is connected to the piping of the concerned film-forming object.

The detailed structure of the film formation apparatus 30 will be explained by referring to FIG. 3. The film formation apparatus 30 has a surge tank 31, the circulation pipe 35, an iron (II) ion injection apparatus 85, an oxidizing agent injection apparatus 86, a pH adjustment agent injection apparatus 87, a chromium ion injection apparatus 88, a filter 51, a heater 53, a decomposition apparatus 64, and a cation exchange resin tower 60.

An opening/closing valve 47, a circulation pump 48, a valve 49, the heater 53, valves 55, 56, and 57, the surge tank 31, a circulation pump 32, a valve 33, and an opening/closing valve 34 are provided to the circulation pipe 35 in this order from the upstream side. The valve 50 and the filter 51 are installed to a pipe 71 connected to the circulation pipe 35, bypassing the valve 49. A pipe 66 bypassing the heater 53 and valve 55 is connected to the circulation pipe 35 and a cooler 58 and a valve 59 are installed in the pipe 66. The cation exchange resin tower 60 and a valve 61 are installed in a pipe 67 with both ends connected to the circulation pipe 35 bypassing the valve 56. A mixed bed resin tower 62 and a valve 63 are installed in a pipe 68 with both ends connected to the pipe 67 bypassing the cation exchange resin tower 60 and valve 61.

The valve 65 and decomposition apparatus 64 are installed to a pipe 69 bypassing the valve 57 and being connected to the circulation pipe 35. The decomposition apparatus 64 is internally filled with, for example, activated carbon catalysts that were made by supporting ruthenium on the surface of activated carbon. The surge tank 31 is installed to the circulation pipe 35 between the valve 57 and the circulation pump 32. A pipe 70 provided with a valve 36 and an ejector 37 is connected to the circulation pipe 35 between the valve 33 and the circulation pump 32, and is furthermore connected to the surge tank 31. A hopper (not drawn) is provided to the ejector 37 to supply the surge tank 31 with potassium permanganate (oxidation decontamination agent) used for oxidize and dissolve a contaminant on the inner surface of the recirculation pipe 22 for forming a ferrite film including chromium and furthermore, with oxalic acid (reduction decontamination anent) used to reduce and dissolve a contaminant on the inner surface of the recirculation pipe 22.

The iron (II) ion injection apparatus 85 has a bath tank 45, an injection pump 43, and an injection pipe 72. The bath tank 45 is connected to the circulation pipe 35 through the injection pipe 72 having the injection pump 43 and a valve 41. The bath tank 45 is filled with a chemical (a second chemical) including iron (II) ions prepared by dissolving iron by formic acid. This chemical includes formic acid. Further, a chemical for dissolving iron is not limited to formate acid, but organic acid or carbonic acid, having counter-anions to iron (II) ions, may be used. As carboxylic acid other than formic acid for dissolving iron, oxalic acid or malonic acid may be used.

The oxidizing agent injection apparatus 66 has a bath tank 46, an injection pump 44, and an injection pipe 73. The bath tank 46 is connected to the circulation pipe 35 through the is injection pipe 73 hang the injection pump 44 and a valve 42. The bath tank 46 is filled with hydrogen peroxide which is an oxidizing agent (a third chemical).

The pH adjustment agent injection apparatus 87 includes a bath tank 40, an injection pump 39, and an injection pipe 74. The bath tank 40 is connected to the circulation pipe 35 with the injection pipe 74 including the injection pump 39 and a valve 38. The bath tank 40 is filled with hydrazine which is a pH adjustment agent (a fourth medicine).

The chromium ion injection apparatus 88 has a bath tank 80, an injection pump 81, and an injection pica 83. The bath tank 80 is connected to the circulation pipe 35 through the injection pipe 83 having the injection pump 81 and a valve 82. The bath tank 80 is filled with a chemical (a first chemical) including trivalent chromium ions prepared by dissolving chromium with formic acid. Further, a chemical for dissolving chromium is not limited to formic acid, but organic acid or carbonic acid, having counter-anions to iron (II) ions, may be used. As carboxylic acid for dissolving chromium, oxalic acid or malonic acid may be used. The inventors examined the method of dissolving chromium by formic acid. As a result, if solid chromium is immersed in formic acid, chromium is dissolved completely and the chemical (the first chemical) including chromium ions which can be used to form a ferrite film including chromium can be obtained.

In the present embodiment, a first connection point (a connection point of the injection pipe 83 to the circulation pipe 35) 84 of the chromium ion injection apparatus 88 to the circulation pipe 35, a second connection point (a connection point of the injection pipe 72 to the circulation pipe 35) 78 of the iron (II) ion injection apparatus 85 to the circulation pipe 35, a third connection point (a connection point of the injection pipe 73 to the circulation pipe 35) 79 of the oxidizing agent injection apparatus 86 to the circulation pipe 35, and a fourth connection point (a connection point of the injection pipe 74 to the circulation pipe 35) 77 of the pH adjustment agent injection apparatus 87 to the circulation pipe 35 are arranged in this order from the upstream side toward the downstream side. The first connection point 84 is positioned on the uppermost-stream side. The fourth connection point 77 is preferably arranged at a position as close to the film-forming object as possible in the circulation pipe 35.

A pipe 75 having an installed valve 54 connects the pipe 73 and pipe 69. A pH meter 76 is installed in the circulation pipe 35 on the downstream side of the fourth connection point 77. A conductivity meter 89 is installed in the circulation pipe 35. Before each chemical is injected into the circulation pipe 35, the surge tank 31 is filled with water used for processing. To lower the concentration of the oxygen included in the film formation solution, inert gas such as nitrogen or argon is preferably bubbled in the bath tank 45 and surge tank 31.

The decomposition apparatus 64 can resolve carboxylic acid (for example, formic acid) used as a counter-anion of an iron (II) ion and hydrazine that is the pH adjustment agent. Namely, as a counter-anion of an iron (II) ion, carboxylic acid which can be resolved into water and carbon dioxide in consideration of reduction in amount of the waste, or carbonic acid that can be released as gas to decrease waste is used.

The method of forming the ferrite film according to the present embodiment will be explained by referring to FIG. 1. The procedure shown in FIG. 1 includes not only a process of forming a ferrite film including chromium but also processes of executing chemical decontamination and treating the film formation solution (for example, film forming aqueous solution) used to form a ferrite film including chromium. Firstly, the film formation apparatus 30 is connected to a piping of a film-forming object (step S1). In the operation stop period of the BWR plant after stopping of the operation of the BWR plant for the periodic inspection of the BWR plant, as mentioned above, the circulation pipe 35 is connected to the recirculation pipe (a structural member of the nuclear power generation plant) 22 which is the piping of the film-forming object.

Chemical decontamination is carried out for the film-forming object region (step S2). In the BWR plant experiencing the operation, an oxide film is formed on the inner is surface of the recirculation pipe 22 coming in contact with cooling water (hereinafter, referred to as reactor water) in the RPV 12. This oxide film includes radionuclides. An example of the step S2 is a process of removing the oxide film from the inner surface of the recirculation pipe 22 which is a film-forming object, by a chemical treatment. Though objects of formation of a ferrite film including chromium on the piping which is a film-forming object are corrosion suppression of the inner surface of the recirculation pipe and deposition suppression of the radionuclide on this inner surface, when forming the ferrite film, it is preferable to execute chemical decontamination beforehand for the inner surface of the recirculation pipe 22.

Since the chemical decontamination applied at Step S2 is a known method (refer to Japanese Patent Laid-open No. 2000-105295), it will be explained briefly. Firstly, each of the valves 34, 33, 57, 56, 55, 49, and 47 is opened and in the state that the other valves are closed, the circulation pumps 32 and 48 are driven. By doing this, the water in the surge tank 31 is circulated in the closed loop of the circulation pipe 35 and recirculation pipe 22. The circulating water is heated by the heater 53 and when the temperature of the circulating water is raised to 90° C., the valve 36 is opened. The potassium permanganate of a necessary amount supplied from the hopper connected to the ejector 37 is introduced into the surge tank 31 by the water flowing in the pipe 70. The potassium permanganate is dissolved by water in the surge tank 31 and an oxidization decontamination solution (potassium permanganate aqueous solution) is generated. The oxidization decontamination solution is supplied into the recirculation pipe 22 through the circulation pipe 35 from the surge tank 31 by driven by the circulation pump 32. The oxidization decontamination solution oxidizes and dissolves contaminants such as an oxide film formed on the inner surface of the recirculation pipe 22.

After the oxidization decontamination was finished, oxalic acid is injected into the surge tank 31 from the hopper. The potassium permanganate included in the oxidization decontamination solution is dissolved by the oxalic acid. Thereafter, a reduction decontamination solution (oxalic acid aqueous solution) generated in the surge tank 31 and adjusted in pH is supplied into the recirculation pipe 22 by the circulation pump 32 and reduces and dissolves a corrosion product existing on the inner surface of the recirculation pipe 22. The pH of the reduction decontamination solution is adjusted by hydrazine supplied into the circulation pipe 35 from the bath tank 40. A part of the reduction decontamination solution discharged from the recirculation pipe 22 and returned to the circulation pipe 35 is introduced to the cation exchange resin tower 60 by a necessary valve operation to remove metallic cations.

After the reduction decontamination was finished, the valve 65 is opened, and a degree of opening of the valve 57 is adjusted, and a part of the reduction decontamination solution flowing in the circulation pipe 35 is supplied to the decomposition apparatus 64. The oxalic acid and hydrazine which are included in the reduction decontamination solution are decomposed by the action of the hydrogen peroxide introduced to the decomposition apparatus 64 through the pipe 75 from the bath tank 46 and by the action of the activated carbon catalyst in the decomposition apparatus 64. After decomposition of the oxalic acid and hydrazine, the valve 55 is closed, and the heating by the heater 53 is stopped. At the same time, the valve 59 is opened, and the decontamination solution is cooled by the cooler 58. The cooled decontamination solution on (for example, 60° C.) is supplied to the mixed bed resin tower 62 to remove impurities.

After the chemical decontamination of the recirculation pipe 22 which is a structural member of the nuclear power generation plant is finished, the formation process of a ferrite film including chromium is executed.

After the decontamination of the film-forming object was finished, the temperature of the film formation solution is adjusted (step S3). After the decontamination of the film-forming object was finished, that is, the last clean-up operation by the film formation apparatus 30 was finished, the following valve operation is performed. The valve 50 is opened, and the valve 49 is closed, and then, water is started to pass through the filter 51. The valve 56 is opened, and the valve 63 is closed, thus the water passing into the mixed bed resin tower 62 is stopped. Furthermore, the valve 55 is opened and the water in the circulation pipe 35 is heated up to a predetermined temperature by the heater 53. Each of the valves 47, 57, 33, and 34 is opened and each of the valves 36, 59, 61, 65, 38, 41, 42, and 82 is closed. The circulation pumps 32 and 48 are rotated. The passing of water to the filter 51 is to remove minute solids that remained in the water. By the passing of the water, it is prevented to form the ferrite film on the surfaces of the solids and to use wastefully chemicals. Further, when the supply of the film formation solution to the filter 51 is executed during chemical decontamination, there is a fear that the pressure loss of the filter 51 may be increased by hydroxide caused by iron of a high concentration generated by dissolution, so that it is not appropriate.

In the present embodiment, the temperature of the film formation solution is adjusted to 90° C. by the heater 53 and is held at this temperature during formation of the ferrite film including chromium ions on the inner surface of the recirculation pipe 22. However, the temperature of the film formation solution is not limited to that temperature. In effect, it is desirable that the ferrite film including chromium can be formed on a level necessary to suppress corrosion of the recirculation pipe 22 which is a structural member during operation of the reactor and the membrane structure such as a crystal, of this ferrite film may be formed finely. Therefore, the temperature of the film formation solution is preferably 100° C. or lower, and though the lower limit of the temperature of the film formation solution may be 20° C., it is preferably 6° C. or higher at which temperatures, the velocity generation of the ferrite film including chromium is practical. Therefore, the temperature of the film formation solution in the film forming process is desirably adjusted to a temperature within the range from 60° C. to 100° C. by controlling the heater 53. Since the temperature of the film formation solution is 100° C. or lower, the pressurization for suppressing boiling of the film formation solution is not necessary, and there is no need to make the structure of the film formation apparatus 30, which is a temporary equipment, pressure-resistant, thus the film formation apparatus 30 can be miniaturized.

After end of the chemical decontamination and before each chemical described later is injected into the circulation pipe 35, a liquid supplied from the circulation pipe 35 into the recirculation pipe 22 is water which becomes a film formation solution by injection of each chemical.

To prevent iron (II) ions included in the second chemical from oxidization and generation of ferric hydroxide, it is necessary to remove dissolved oxygen in the film formation solution. Therefore, it is preferable to execute bubbling of inert gas or vacuum degassing in the surge tank 31 and bath tank 45.

The chemical (the first chemical) including chromium ions is injected into the film formation solution (step S4). The valve 82 is opened, and the injection pump 81 is driven, thus the chemical solution (the first chemical) including chromium ions and formic acid is injected into the film formation solution (water when the first chemical is firstly injected) which is a aqueous solution at a predetermined temperature (for example, 90° C.) flowing in the circulation pipe 35 from the first connection point 84 through the injection pipe 83 from the bath tank 80. A aqueous solution including chromium ions and formic acid is supplied into the recirculation pipe 22 through the circulation ripe 35. The aqueous solution discharged from the recirculation pipe 22 is returned to the circulation pipe 35.

The chemical solution the second chemical) including iron (II) ions is injected into the film formation solution (step S5). The valve 41 is opened, and the injection pump 43 is driven, thus the chemical solution (the second chemical) including iron (II) ions and formic acid is injected into the film formation solution which is the aqueous solution including chromium ions flowing in the circulation pipe 35 through the injection pipe 72 from the bath tank 45. Here, the second chemical injected, for example, includes iron (II) ions prepared by dissolving iron by formic acid and the formic acid. A part of the acted iron (II) ions becomes iron hydroxide in the film formation solution.

The oxidizing agent (the third chemical) is injected into the film formation solution (step S6). The valve 42 is opened, and the injection pump 44 is driven, and hydrogen peroxide which is an oxidizing agent is injected into the film formation solution including chromium ions, iron (I) ions, and iron hydroxide which flows in the circulation pipe 35, through the injection pipe 73 from the bath tank 46. As an oxidizing agent, a chemical including dissolved ozone or oxygen may be used except the hydrogen peroxide.

A pH adjustment agent (the fourth chemical) is injected into the film formation solution (step S7). The valve 38 is opened, and the injection pump 39 is driven, thus the pH adjustment agent (for example, hydrazine) is injected into the film formation solution flowing in the circulation pipe 35 through the injection pipe 74 from the bath tank 40. The pH meter 76 measures the pH of the film formation solution flowing in the circulation pipe 35. The controller (not drawn) adjusts amount of the injection of the hydrazine by controlling the rotational speed of the injection pump 39 (or degree of opening of the valve 38) based on the pH measured value, and adjusts the pH of the film formation solution within the range from 5.5 to 9.0, for example, to 7.0. Namely, the pH of the film formation solution which is a aqueous solution including hydrazine, iron (II) ions, chromium ions, iron hydroxide, formic acid, and hydrogen peroxide is adjusted to 7.0. At this time, the film formation solution includes hydrazine of 20000 ppm.

In the present embodiment, at the step S4, the rotational speed of the injection pump 81 (or the degree of opening of the valve 82) is controlled to adjust amount of the injection of the chemical solution including chromium ions and formic acid into the circulation pipe 35, thereby adjusting, the chromium ion concentration of the film formation solution supplied to the recirculation pipe 22 to, for example, 200 ppm. At the step S5, the rotational speed of the injection pump 43 (or the opening of the valve 41) is controlled to adjust amount of the injection of the chemical solution including iron (II) ions and formic acid into the circulation pipe 35, thereby adjusting the concentration of the iron (II) ion included in the film formation solution supplied to the recirculation pipe 22 to, for example, 300 ppm.

Since the film formation solution including chromium ions of 200 ppm, iron (II) ions of 300 ppm, iron hydroxide, and hydrogen peroxide in which the pH is adjusted to 7.0 by hydrazine and the temperature is 90° C. is supplied to the recirculation pipe 22 and come in contact with the inner surface of the recirculation pipe 22, the chromium ions, iron (II) ions, and iron hydroxide included in the film formation solution are adsorbed to the inner surface of the recirculation pipe 22 which is a structural member of the nuclear power generation plant and is ferritized by the action of hydrogen peroxide. Consequently, a ferrite film including chromium, for example, an $Fe_{2.95}Cr_{0.05}O_4$, film is formed on the inner surface of the recirculation pipe 22. The hydrogen peroxide included in the film formation solution causes a reaction of oxidizing the iron (II) ions and iron hydroxide adsorbed to the inner surface of the recirculation pipe 22 and ferritizing them. The ferrite film including chromium is formed on the inner surface of the recirculation pipe 22 as mentioned above because the pH of the film formation solution is adjusted to 7.0 by hydrazine for progressing the ferrite film generation reaction including chromium.

The circulation pumps 32 and 48 are driven, so that the film formation solution including hydrazine, chromium ions, iron (I) ions, iron hydroxide, and hydrogen peroxide is supplied into the recirculation pipe 22 by the circulation pipe 35 through the opening/closing valve 34. The film formation solution flows in the recirculation pipe 22 and is returned to the circulation pipe 35 on the side of the valve 47. The chemical solution (the first chemical) including chromium ions and formic acid, the chemical solution (the second chemical) including iron (II) ions and formic acid, hydrogen peroxide (the third chemical) and hydrazine (the fourth chemical) are injected into the returned film formation solution and this film formation solution in which each of the chemicals is injected is introduced again into the recirculation pipe 22. The film formation solution (for example, a film forming aqueous solution) comes in contact with the inner surface of the recirculation pipe 22, thus chromium ions, iron (I) ions, and iron hydroxide are adsorbed to the inner surface of the recirculation pipe 22 which is a structural member, and the adsorbed chromium ions, iron (I) ions, and iron hydroxide are ferritized by hydrogen peroxide, and the pH is controlled to 7.0 by the action of hydrazine, so that a ferrite film having a main component of ferrite including chromium is formed on the inner surface of the recirculation pipe 22.

The chemical solution including chromium ions, medicinal solution including iron (II) ions, hydrogen peroxide, and hydrazine are injected into the film formation solution by execution of the steps S4 to S7. The injection of each chemical at the steps S4 to S7 is preferably executed continuously. More concretely, when the film formation solution with the chemical including chromium ions injected at the first connection point 84 reaches the second connection point 78, the chemical including iron (II) ions is injected into the film formation solution. When the film formation solution including chromium ions and iron (II) ions reaches the third connection point 79, hydrogen peroxide which is an oxidizing agent is injected. When the film formation solution including chromium ions iron (II) ions, and hydrogen peroxide reaches the fourth connection point 77, the injection of hydrazine which is a pH adjustment agent into the film formation solution is executed.

To prevent formation of a ferrite film including useless chromium on the inner surface of the circulation pine 35, the injection point of the pH adjustment agent into the circulation pipe 35 is preferably set in a position close to the recirculation pipe 22 which is a film-forming object, that is, a position close to the connection point of the opening/closing valve 34 to the circulation pipe 35.

Whether the forming process of the ferrite film including chromium has been completed or not is decided (step S8). This decision is made by the lapse time after start of the forming process of the ferrite film including chromium. Before the lapse time reaches the time required to form a ferrite film including chromium on the inner surface of the recirculation pipe 22 with a predetermined thickness, the decision at the step 38 is "NO". The operations at the steps S4 to S7 are performed repeatedly. When the decision at the step S8 becomes "YES", the controller (not drawn) stops the injection pumps 39, 43, 44, and 81 (or closes the valves 38, 41, 42, and 82), and stops the injection of each chemical solution into the circulating film formation solution. Therefore, the forming operation of the ferrite film including chromium on the inner surface of the recirculation pipe 22 is finished. The ferrite film including chromium with the predetermined thickness is formed on overall the inner surface of the recirculation pipe 22 coming in contact with the film formation solution.

The injection of the chemical solution including iron (II) ions, chemical solution including chromium ions, hydrogen peroxide, and hydrazine into the film formation solution, is executed continuously until, the ferrite film including chromium with the predetermined thickness is formed on the inner surface of the recirculation pipe 22.

Thereafter, the decomposition, of the chemicals included in the film formation solution is executed (step S9). Even after completion of the formation of the ferrite film including chromium, the film formation solution used to form the ferrite film including chromium on the inner surface of the recirculation pipe 22 includes hydrazine and formic acid which is an organic acid. The hydrazine and formic acid which are chemicals included in the film formation solution is decomposed by the decomposition apparatus 64 as is the case with the decomposition of oxalic acid which is a reduction decontamination agent. In the decomposition process of each chemical included in the film formation solution, each degree of openings of the valves 57 and 65 is adjusted and a part of the film formation solution in the circulation pipe 35 is supplied to the decomposition apparatus 64. When the valve 54 is opened, hydrogen peroxide is supplied to the decomposition apparatus 64 through the pipe 75 from the bath tank 46. The hydrazine and formic acid are decomposed by the action of hydrogen peroxide and an activated carbon catalyst in the decomposition apparatus 64. The hydrazine is decomposed to nitrogen and water and the formic acid is decomposed to carbon dioxide and water. After completion of the decomposition of each chemical included in the film formation solution, the circulation pipe 35 is removed, from the recirculation pipe 22 and the valve 28 is restored as before. By doing this, the BWR plant becomes a state capable of starting.

An ultraviolet-light irradiation apparatus may be used instead of the decomposition apparatus 64 using a catalyst. The ultraviolet-light irradiation apparatus can decompose hydrazine, formic acid, and oxalic acid in the presence of an oxidizing agent.

According to the present embodiment, since a ferrite film (an $Fe_{2.95}Cr_{0.05}O_4$ film) including 5% of chromium is formed on the inner surface of the recirculation pipe 22, which is a structural member of the BWR plant, coming in contact with cooling water, the time required to form the ferrite film can be shortened than that of the method of forming ferrite film described in Japanese Patent Laid-open No. 2006-38483. In other words, when forming the ferrite film for the same period of time in the present embodiment and the method of forming ferrite film described in Japanese Patent Laid-open. No. 2006-38483, the thickness of the ferrite film including chromium formed on the surface of the structural member of the BWR plant coming in contact with cooling water in the present embodiment is thicker than the thickness of the ferrite film formed by the method of forming ferrite film described in Japanese Patent Laid-open No. 2006-38483. Therefore, in the present embodiment, the corrosion of the structural member can be suppressed more than the ferrite film formed by the method of forming the ferrite film described in Japanese Patent Laid-open No. 2006-38483.

The present embodiment can reduce the amount of $^{60}Co$ deposition on the inner surface of the recirculation pipe 22 in the strong reduction environment.

In the present embodiment, hydrazine and formic acid are decomposed by the decomposition apparatus 64 as mentioned above to gas and water, thus the removal of hydrazine by the cation exchange resin tower 60 and formic acid by the mixed bed resin tower 62 can be avoided, so that abolition amount of the used ion exchange resin in the cation exchange resin tower 60 and mixed bed resin tower 62 can be reduced remarkably.

Since, as an oxidizing agent necessary to form a ferrite film including chromium and an oxidizing agent used to decompose hydrazine and formic acid included in the film formation solution, the present embodiment uses hydrogen peroxide of the same kind, the bath tank 46 filled with an oxidizing agent and the injection pump 44 for transferring it can be shared. Therefore, the structure of the film formation apparatus 30 can be simplified.

The present embodiment does not use a chemical including chlorine as a chemical used to form a ferrite film including chromium, so that the soundness (for example, corrosion resistance) of the structural member of the BWR plant is not damaged. Further, to suppress the use amount of each chemical, it is preferable to separate and remove an excessive reaction product, collects an unreacted chemical, and reuse the unreacted chemical after collection.

The present embodiment can be applied to formation of a ferrite film including chromium on the inner surface of the pipe connected to the reactor pressure vessel of a pressurized water nuclear power generation plant (PWR plant).

Embodiment 2

Figure 9:
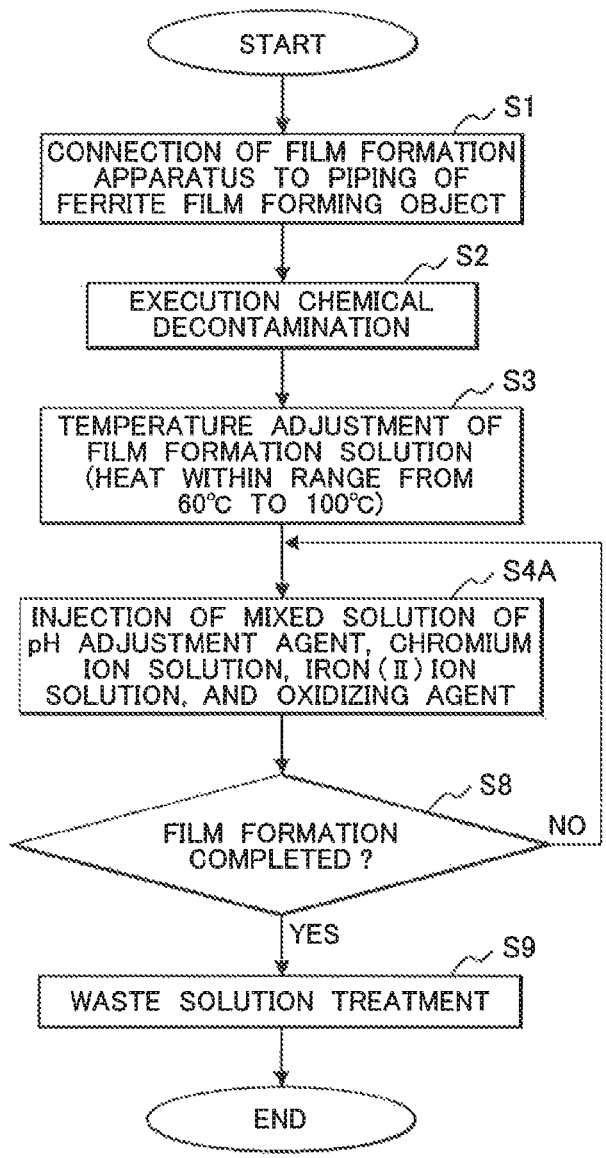
FIG. 9 is a flowchart showing a processing procedure being carried out in a method of forming a ferrite film on a structural member composing a plant according to Embodiment 2 which is another embodiment of the present invention, applied to a BWR plant.
Figure 10:
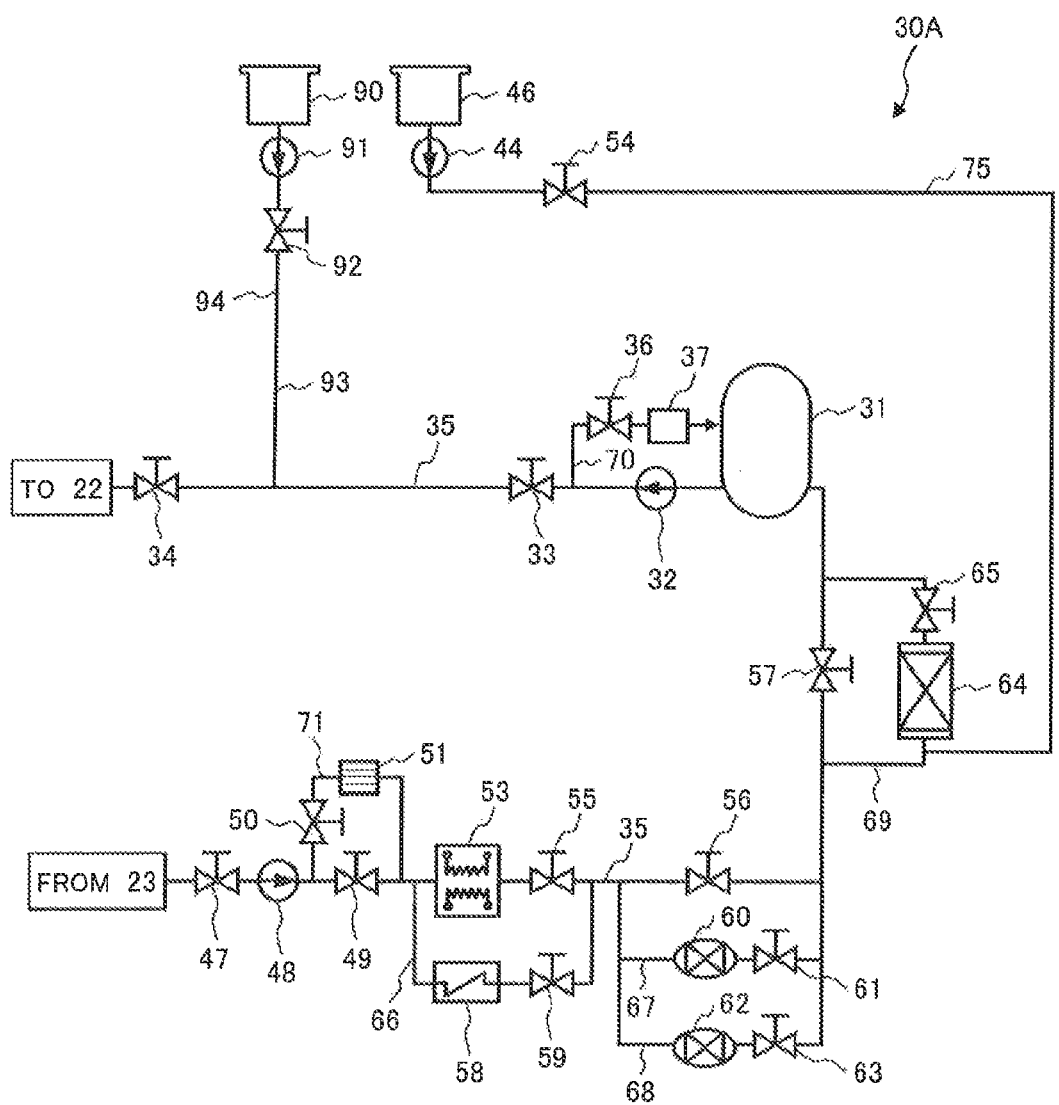
FIG. 10 is a detailed structural diagram showing a film formation apparatus used for a method of forming a ferrite film on a structural member composing a plant shown in FIG. 9.

A method of forming a ferrite film on a structural member composing a plant according to the embodiment 2 which is another embodiment of the present invention, applied, to a recirculation pipe in a BWR plant, will be explained by referring to FIGS. 9 and 10.

The chemical solution (the first chemical) including chromium ions and formic acid, the chemical solution (the second chemical) including iron (II) ions and formic acid, hydrogen peroxide which is an oxidizing agent, and hydrazine which is a pH adjustment agent are mixed beforehand in the non-radiation controlled area (for example, a factory, etc.) outside the radiation controlled area, and a film formation solution including iron (II) ions, chromium ions, formic acid, hydrazine, hydrogen peroxide, and iron hydroxide are used by the method of forming a ferrite film on the plant structural member of the present embodiment.

A film formation apparatus 30A used in the present embodiment will be explained by referring to FIG. 10. The film formation apparatus 30A, in the film formation apparatus 30 used in the embodiment 1, has a structure that the iron (II) ion injection apparatus 85, oxidizing agent injection apparatus 86, pH adjustment agent injection apparatus 87, and chromium ion injection apparatus 88 are replaced with a chemical solution injection apparatus 93 and the bath tank 46 filled with an oxidizing agent is not directly connected to the circulation pipe 35 but connected to the pipe 69. The other structures of the film formation apparatus 30A are the same as those of the film formation apparatus 30.

The chemical solution injection apparatus 93 has a bath tank 90, an injection pump 91, and an injection pipe 94. The bath tank 90 is connected to the circulation pipe 35 with the injection pipe 94 including the injection pump 91 and a valve 92. A film formation solution of pH 7.0 including iron (II) ions, chromium ions, formic acid, hydrogen peroxide, and hydrazine is filled in the bath tank 90. The film formation solution of pH 7.0 including iron (II) ions, chromium ions, formic acid, hydrogen peroxide, and hydrazine is produced in the non-radiation controlled area, for example, a factory and is filled in a transport container at the factory. The transport container with the film formation solution filled is transported from the factory into a reactor building which is a radiation controlled area and in the reactor building, the film formation solution in the transport container is transferred into the bath tank 90 of the film formation apparatus 30A. At this time, both ends of the circulation pipe 35 of the film formation apparatus 30A, similarly to the embodiment 1, are connected to the recirculation pipe 22 as with the embodiment 1. The pH of the film formation solution filled in the bath tank 90 is adjusted to 7.0 by the action of hydrazine. In the film formation solution transferred into the bath tank 90, hydrazine of 20000 ppm is included.

Since the film formation solution transported by the transport container includes hydrazine which is a pH adjustment agent, ferrite is suppressed from formation in the film formation solution in the transport container during transport of the film formation solution. Therefore, even after the film formation solution generated outside the non-radiation controlled area is transported into the reactor building, a ferrite film including chromium with a necessary thickness can be formed on the film-forming object, that is, on the surface of the structural member (for example, the recirculation pipe 22) of the BWR plant coming in contact with cooling water, by using the film, formation solution.

The method of forming a ferrite film on the structural member composing the plant of the present embodiment using the film formation apparatus 30A will be explained based on of the procedure shown in FIG. 9. Firstly, even in the present embodiment, the processes of the steps S1 to S3 which are executed in embodiment 1 are executed. After completion of the step S3, the film formation solution including iron (II) ions, chromium ions, formic acid, hydrogen peroxide, and hydrazine is injected (step S4A). The valve 92 is opened, and the injection pump 91 is started, thus the film formation solution of pH 7.0 including iron (II) ions of 300 ppm, chromium ions of 200 ppm, formic acid, hydrogen peroxide, and hydrazine, existing in the bath tank 90, is injected into hot water at 90° C. existing in the circulation pipe 35 through the injection pipe 94. The film formation solution is pressurized by the circulation pumps 32 and 48 and is supplied into the recirculation pipe 22. Therefore, similarly to the embodiment 1, a ferrite film (for example, a $Fe_{2.95}Cr_{0.05}O_4$ film) including chromium is formed on overall the inner surface of the recirculation pipe 22 coming in contact with the film formation solution. At the step S8, when it is decided that a ferrite film including chromium at a predetermined thickness has been formed, the circulation pumps 32 and 48 are stopped, and the supply of the film formation solution to the recirculation pipe 22 is stopped, thus the film forming operation, is finished. Thereafter, at the step S9, the formic acid and hydrazine which are included in the film formation solution are decomposed. At this time, the hydrogen peroxide in the bath tank 46 is supplied to the decomposition apparatus 64 through the pipe 75.

In the present embodiment, the processes at the steps S1 to S3, S4A, S8, and S9 are executed during the operation stop period of the BWR plant.

The present embodiment can obtain the effects generated in the embodiment 1. Since the present embodiment uses the chemical solution injection apparatus 93 for injecting the film formation solution including iron (II) ions, chromium ions, formic acid, hydrogen peroxide, and hydrazine, the structure of the film formation apparatus 30A can be simplified more than the film formation apparatus 30 and the film forming procedure can be simplified more than that of the embodiment 1.

Embodiment 3

A method of forming a ferrite film on a structural member comprising a plant according to embodiment 3 applied to a feed water pipe of a BWR plant, which is another embodiment of the present invention will be explained by referring to FIGS. 11 and 12.

Figure 12:
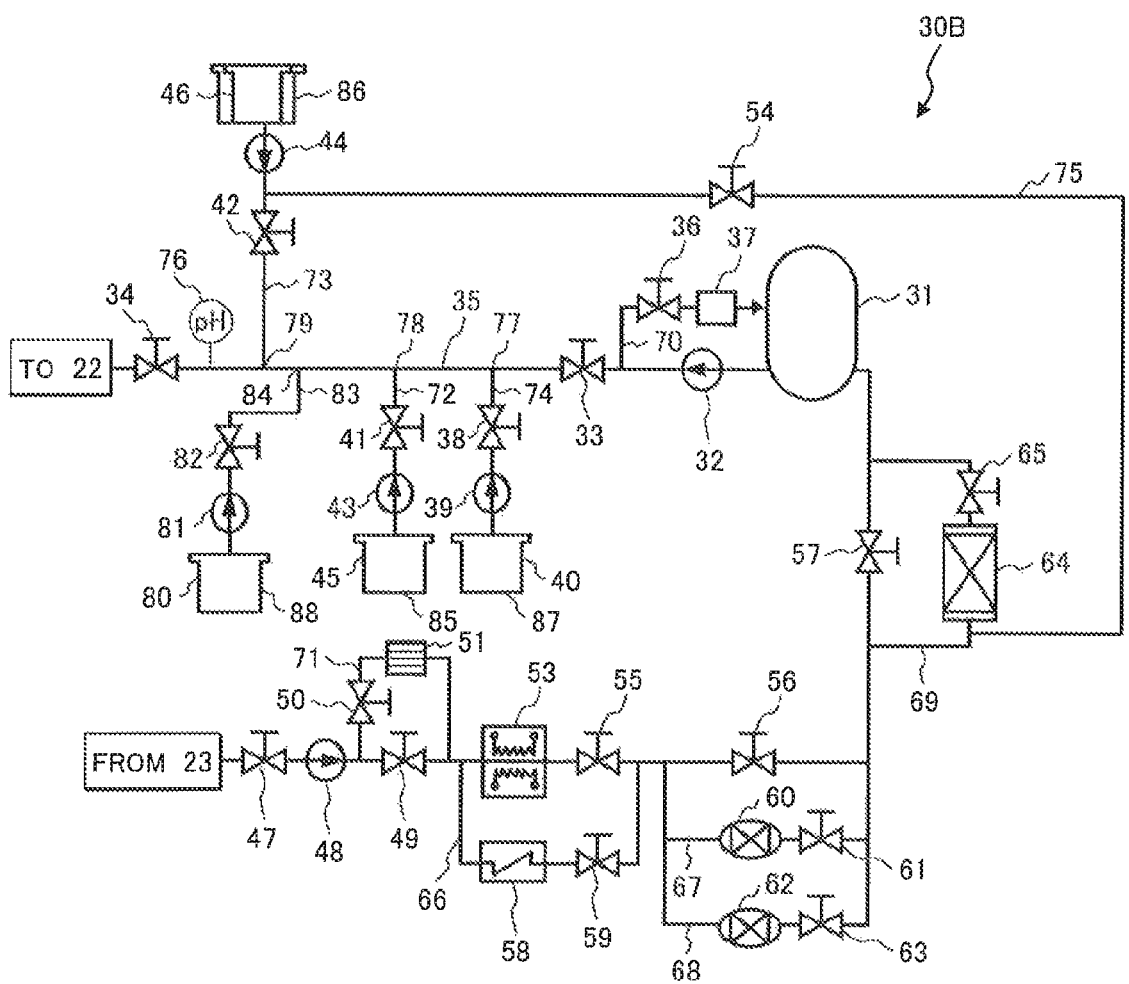
FIG. 12 is a detailed structural diagram showing a film formation apparatus used for a method of forming a ferrite film on a structural member composing a plant shown in FIG. 11.

In the method of forming the ferrite film on the structural member composing the plant of the present embodiment, a film formation apparatus 30B shown in FIG. 12 is used. The film formation apparatus 30B includes all the components possessed by the film formation apparatus 30 used in the embodiment 1. The film formation apparatus 30B has a structure that the arrangement of the chromium ion injection apparatus 88, iron (II) ion injection apparatus 85, oxidizing agent injection apparatus 86, and pH adjustment agent injection apparatus 87 is changed in the film formation apparatus 30, in the film formation apparatus 30B, the pH adjustment agent injection apparatus 87, iron (II) ion injection apparatus 85, chromium ion injection apparatus 88, and oxidizing agent injection apparatus 86 are arranged in this order toward the opening/closing valve 34 from the circulation pump 32. The other structures of the film formation apparatus 30B are the same as those of the film formation apparatus 30. By the arrangement of each injection apparatus aforementioned, the fourth connection point 77, second connection point 78, first connection point 84, and third connection point 79 are formed on the circulation pipe 35 in this order toward the opening/closing valve 34 from the circulation pump 32. When injecting the hydrazine which is a pH adjustment agent into the film formation solution flowing in the circulation pipe 35 prior to hydrogen peroxide which is an oxidizing agent, the third connection point 79 of the oxidizing agent injection apparatus 86 is preferably disposed at a position close to the water feed pipe 10 which is a film-forming object.

The method of forming the ferrite film on the structural member composing the plant of the present embodiment using the film formation apparatus 30B will be explained based on the procedure shown in FIG. 11. In the step S1, one end of the circulation pipe 35 of the film formation apparatus 30B is connected to the water feed pipe 10 between the condensate clean-up apparatus 6 and the low pressure feed water heater 8 and another end of the circulation pipe 35 is connected to the water feed pipe 10 between the connection point of the clean-up system pipe 20 to the water feed pipe 10 and the high pressure feed water heater 9. Thereafter, the chemical decontamination at the step S2 and the temperature adjustment of the film formation solution (or water) at the step S3 are executed. As to the chemical solution, firstly, the pH adjustment agent is injected (step S7). The valve 38 is opened and the injection pump 39 is driven, thus the pH adjustment agent (for example, hydrazine) is injected into the film formation solution (water when the hydrazine is injected first) flowing in the circulation pipe 35 from the bath tank 40. The chemical solution including iron (II) ions is injected into the film formation solution (step S5). When the solution including hydrazine reaches the second connection point 78, the chemical solution (the second chemical) including iron (II) ions and formic acid is injected into the solution including hydrazine flowing in the circulation pipe 35 from the bathe tank 45. The chemical solution including (the first chemical) including chromium ions is injected into the film formation solution (step S4). When the solution including hydrazine, iron (II) ions, and formic acid reaches the first connection point 84, the chemical solution including chromium ions is injected into the circulation pipe 35 from the bath tank 80. An oxidizing agent is injected into the film formation solution (step S6). When the solution including hydrazine, iron (II) ions, formic acid, and chromium ions reaches the third connection point 79, hydrogen peroxide which is an oxidizing agent is injected into the circulation pipe 35 from the bath tank 46.

The film formation solution at pH of 7.0 and 90° C. including hydrazine, iron (II) ions, formic acid, chromium ions, and hydrogen peroxide is supplied into the water feed pipe 10 through the circulation pipe 35. The film formation solution includes hydrazine of 20000 ppm.

The pH of the film formation solution flowing in the circulation pipe 35 is measured by the pH meter 76. The control apparatus (not drawn) controls the rotational speed of the injection pump 39 (or the opening of the valve 38) based on the pH measured value to adjust the injection amount of hydrazine into the circulation pipe 35, thereby adjusting the pH of the film formation solution within the range from 5.5 to 9.0, for example to 7.0.

The film formation solution, for example, at 90° C. with the pH adjusted to 7.0 including iron (II) ions, chromium ions, hydrogen peroxide, and hydrazine of 20000 ppm comes in contact with the inner surface of the water feed pipe 10. The film formation solution is returned to the circulation pipe 35 from the water feed pipe 10 and as mentioned above, the concerned chemical is injected from each injection apparatus into the film formation solution flowing in the circulation pipe 35. The film formation solution at 90° C. including iron (II) ions of 300 ppm, chromium ions of 200 ppm, and hydrogen peroxide comes in contact with the inner surface of the water feed pipe 10 made of carbon steel, thus by the action of iron (II) ions, chromium ions, and hydrogen peroxide, a ferrite film (for example, an $Fe_{2.95}Cr_{0.05}O_4$ film) including chromium is formed on the inner surface of the water feed pipe 10. The ferrite film including chromium is formed on overall the inner surface of the water feed pipe 10 coming in contact with the film formation solution.

After completion of the operation at the step S7, a decision at the step S8 is made and when the decision is "NO", the operations as the steps S7, S5, S4, S6, and S8 are repeated. When the decision is "YES", the process at the step S9 is executed and the forming operation of the ferrite film including chromium on the inner surface of the water feed pipe 10 is finished. When the process at the step S9 is finished, the circulation pipe 35 is removed from the water feed pipe 10 during the operation stop period of the BWR plant.

The present embodiment can obtain each effect generated in the embodiment 1. In the present embodiment, the pH adjustment agent is injected first into the film formation solution, and the pH of the film formation solution is adjusted to a pH value for example, 7.0) included within the range from 5.5 to 9.0, so that the film formation solution of pH 4.0 including no pH adjustment agent but including iron (II) ions, chromium ions, and formic acid can be avoided from coming in contact with the inner surface of the water feed pipe 10. Therefore, when forming the ferrite film including chromium on the inner surface of the water feed pipe 10, no iron (II) ions are eluted from the inner surface of the water feed pipe 10. In the present embodiment, the ferrite including chromium which is generated on the inner surface of the water feed pipe 10 is strongly deposited to the inner surface of the water feed pipe 10 due to the ferritization reaction because no iron (II) ions are eluted from the inner surface of the water feed pipe 10. Therefore, the ferrite film including chromium with a preset thickness can be formed on the inner surface of the water feed pipe 10.

After first injection of the pH adjustment agent, the injection order of another chemical solution into the film formation solution may be any injection order.

A liquid adjusted to a pH value within the range from 5.5 to 9.0 by addition of the pH adjustment agent is supplied into the water feed pipe 10 through the circulation pipe 35, and thereafter, even if a liquid of pH 7.0 including iron (II) ions, chromium ions, and hydrogen peroxide is supplied to the water feed pipe 10, the aforementioned effect can be obtained.

Embodiment 4

Figure 13:
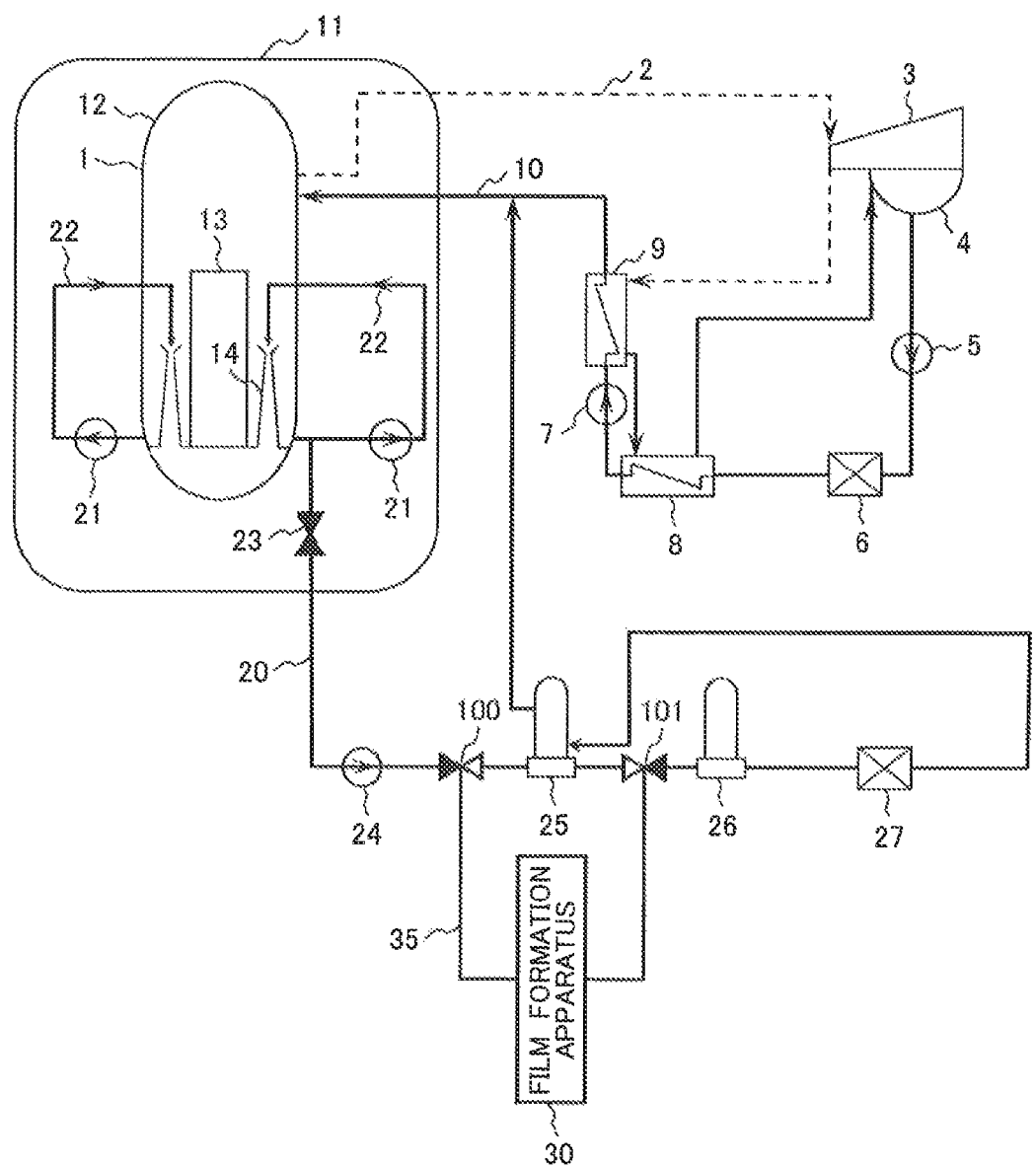
FIG. 13 is an explanatory drawing showing a status in which in a method of forming a ferrite film on a structural member according to Embodiment 4 which is another embodiment of the present invention, applied to a clean-up system pipe in the BWR plant, a film formation apparatus used to execute the method of forming the ferrite film is connected to the clean-up system pipe.

A method of forming a ferrite film on a structural member composing a plant according to embodiment 4 applied to the reactor water clean-up system of the BWR plant, which is still another embodiment of the present invention will be explained by referring to FIG. 13.

Figure 11:
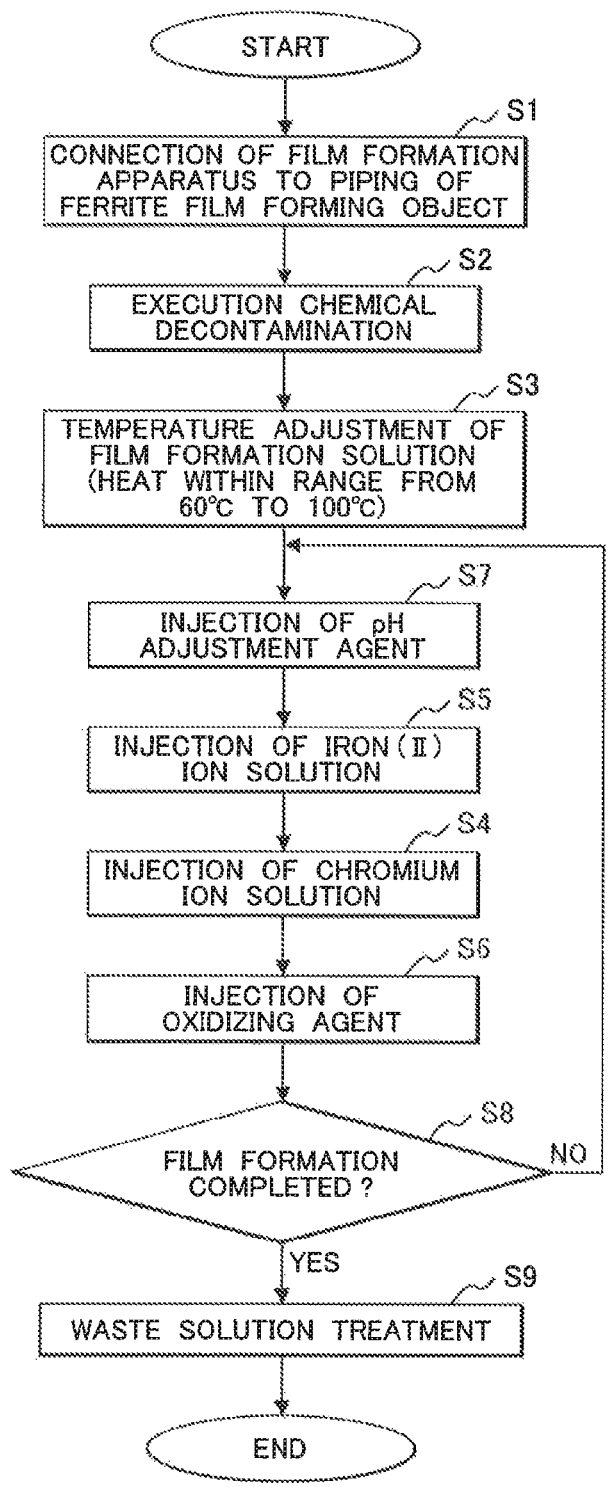
FIG. 11 is a flowchart showing a processing procedure being carried out in a method of forming a ferrite film on a structural member composing a plant according to Embodiment 3 which is another embodiment of the present invention, applied to a feed water pipe in a BWR plant.

In the method of forming a ferrite film on the structural member composing the plant according to the present embodiment, the film formation apparatus 30B used in the embodiment 3 is used and the processing procedure shown in FIG. 11 is applied. In the method of forming the ferrite film of the present embodiment, both end of the circulation pipe 35 of the film formation apparatus 30B are connected to the clean-up system pipe of the reactor clean-up system installed in the BWR plant. A part of the reactor clean-up system with corrosion coming into a question is the regeneration heat exchanger 25, into which hot cooling water flows from the RPV 12. Valves 100 and 101 are installed on the clean-up system pipe 20 on the upstream side and downstream side of the regeneration heat exchanger 25 made of carbon steel.

At the step S1 in the present embodiment which is executed during the operation stop period, of the BWR plant, both end of the circulation pipe 35 of the film formation apparatus 30 are connected to the clean-up system pipe 20. Namely, the bonnet of the valve 100 is opened and one end of the circulation pipe 35 of the film formation apparatus 30B is connected to the flange of the opened bonnet of the valve 100. The valve 23 installed in the clean-up system pipe 20 is closed. The bonnet of the valve 101 is opened and the flange on the side of the non-regeneration heat exchanger 26 is closed. Another end of the circulation pipe 35 of the film formation apparatus 30B is connected to the flange of the opened bonnet of the valve 101. In this way, the film formation apparatus 30B is connected to the clean-up system pipe 20 and the circulation path of a film forming aqueous solution using the clean-up system pipe 20 and circulation pipe 35 is formed.

In the present embodiment, furthermore, the processes at the steps S2, S3, S7, S5, S4, S6, S8, and S9 which are executed in the embodiment 3 are executed in order. By doing this, similarly to the embodiment 1, a ferrite film (for example, an $Fe_{2.95}Cr_{0.05}O_4$ film) including chromium is formed on the shell inner surface of the non-regeneration heat exchanger 25 in contact with the film forming aqueous solution. After completion of the process at the step S9, the circulation pipe 35 is removed from the clean-up system pipe 20 during the operation stop period of the BWR plant.

The present embodiment can obtain each effect generated in the embodiment 3.

When there is not the valve 101 between the regeneration heat exchanger 25 and the non-regeneration heat exchanger 26, desirable to connect the another end of the circulation pipe 35 of the film, formation apparatus 30B to an isolation valve installed in the clean-up system pipe 20 between the non-regeneration heat exchanger 26 and the reactor water clean-up apparatus 27.

In the present embodiment, the film formation apparatus 30A aforementioned may be used instead of the film formation apparatus 30B. When the film formation apparatus 30A is used, each process of the steps S1 to S3, S4A, S8, and S9 shown in FIG. 9 is executed and each effect generated in the embodiment 2 can be obtained.

Either of the film formation apparatuses 30A and 30B can be connected to the carbon steel member in the BWR plant such as the residual heat removal system pipe, water feed system pipe, reactor core isolation cooling system pipe, core spray system pipe, component cooling water system pipe, or cooling water system pipe using the cooling tower to use the method of forming ferrite film including chromium of either of the corresponding embodiments 2 and 3. For example, for the pipe made of stainless steel of the reactor clean-up system, the film formation apparatus 30 used in the embodiment 1 is used and the procedure shown in FIG. 1 may be used.

Furthermore, the method of forming ferrite film including chromium on the carbon steel member of the embodiments 3 and 4 can be applied to the water feed pipe made of carbon steel of not only the BWR plant but also the PWR plant and the water feed pipe made of carbon steel of the thermal power plant. In this case, either of the film formation apparatuses 30A and 30B is connected to the water feed pipe of the concerned plant.

Embodiment 5

Figure 14:
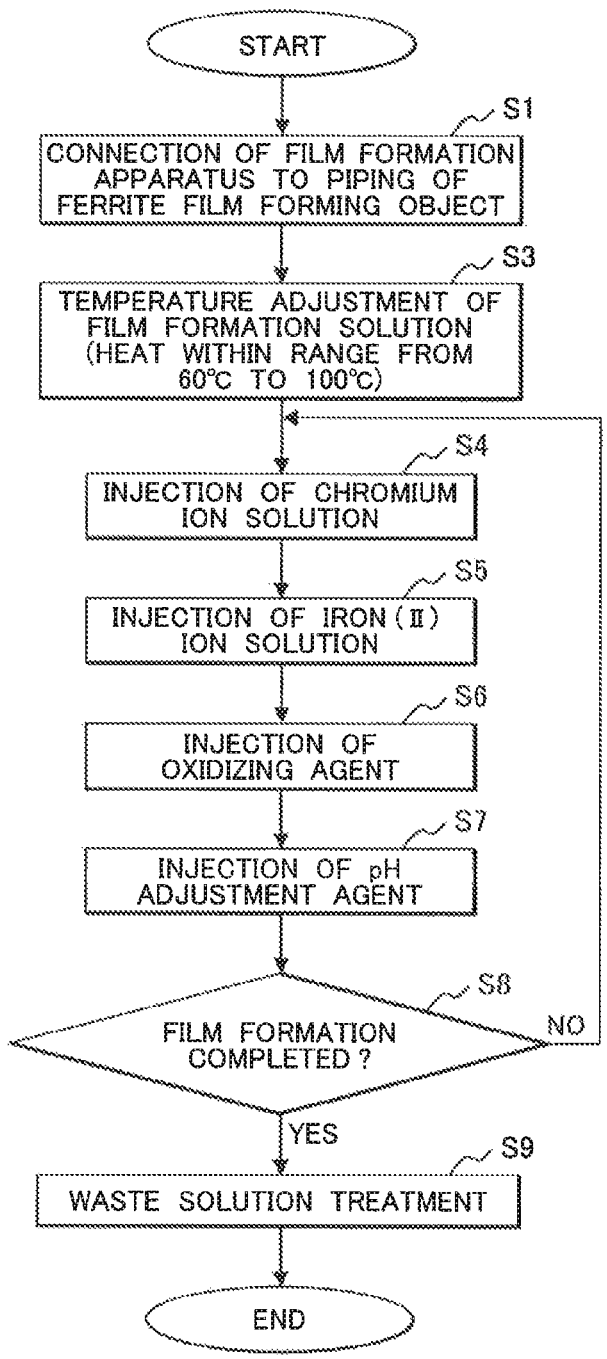
FIG. 14 is a flowchart showing a processing procedure being carried out in a method of forming a ferrite film on a structural member composing a plant according to Embodiment 5 which is another embodiment of the present invention, applied to a newly-built BWR plant.

A method of forming a ferrite film on a structural member composing a plant according to embodiment 5 applied to the recirculation system pipe of the BWR plant, which is another embodiment of the present invention will be explained by referring to FIG. 14. In the embodiments 1 to 4, a ferrite film including chromium is formed on the inner surface of the piping which is a film-forming object, in the BWR plant experiencing the operation in at least one operation cycle.

The method of forming the ferrite film on the structural member of the present embodiment, in the respect of formation of the ferrite film including chromium on the inner surface of the piping of a newly-built BWR plant, is different from that of each embodiment aforementioned. In the present embodiment, each film formation apparatus used in the embodiments 1 to 4, and each procedure executed in the embodiments 1 to 4 excluding the chemical decontamination at the step S2 can be applied. The method of forming the ferrite film of the present embodiment applying the film formation apparatus 30 used in the embodiment 1 and applying each procedure shown in FIG. 1 will be explained below.

In the present embodiment, the construction of the newly-built BWR plant is finished, and before a trial, operation of the BWR plant is started, according to the procedure (the step S2 is excluded) shown in FIG. 1, for example, a ferrite film including chromium is formed on the inner surface of the recirculation pipe 22.

Firstly, in the newly-built BWR plant, the structural member which is a film-forming object, for example, the recirculation pipe 22 which is a piping is finished in installation and before the trial operation of the BWR plant is started, at the step S1, both ends of the circulation pipe 35 of the film formation apparatus 30 are connected to the recirculation pipe 22 of the BWR plant as with the embodiment 1. In the newly-built BWR plant, no radioactive material is deposited on the inner surface of the recirculation pipe 22, so that there is no need to execute chemical decontamination for the recirculation pipe 22. Therefore, in the present embodiment, the chemical decontamination at the step S2 in the procedure shown in FIG. 1 is not executed, so that the water (or the film formation solution) in the circulation pipe 35 at the step S3 is heated and the temperature of the water (or the film formation solution) is adjusted to a temperature within the range from 60° C. to 100° C.

After completion of the temperature rise at the step S3, each process of the steps S4 to S7 are executed, and the chemical including chromium ions, the chemical including iron (II) ions and formic acid, hydrogen peroxide, and hydrazine are injected in order into the circulation pipe 35. As a result, the film formation solution with the pH adjusted to 7.0 and the temperature, adjusted to 90° C. including iron (II) ions, chromium ions, and hydrogen peroxide is supplied to the recirculation pipe 22 and comes in contact with the inner surface of the recirculation pipe 22. The film formation solution includes formic acid and hydrazine of 20000 ppm. The film formation solution comes in contact with the inner surface of the recirculation pipe 22, thus a ferrite film including chromium is formed on the inner surface of the recirculation pipe 22. When the thickness of the ferrite film including chromium formed on the inner surface of the recirculation pipe 22 becomes a predetermined thickness, the decision at the step S8 becomes "YES" and the forming operation of the ferrite film including chromium formed on the inner surface of the recirculation pipe 22 is finished. Thereafter, at the step S9, the formic acid and hydrazine included in the film formation solution are decomposed by the decomposition apparatus 64.

The present embodiment can obtain each effect generated in the embodiment 1.

The present embodiment can be applied also to a newly-built PWR plant and the thermal power plant.

INDUSTRIAL APPLICABILITY

The present invention can be applied to the nuclear power generation plant and thermal power plant.

REFERENCE SIGNS LIST

1: nuclear reactor, 3: turbine, 4: condenser, 10: feed water pipe, 12: reactor pressure vessel, 20: clean-up system pipe, 22: recirculation pipe, 30, 30A and 30B: film formation apparatus, 31: surge tank, 32 and 48: circulation pump, 35: circulation pipe, 37: ejector, 39, 43, 44, 81 and 91: injection pump, 40, 45, 46, 80 and 90 bath tank, 51: filter, 53: heater, 58: cooler, 60: cation exchange resin tower, 62: mixed bed resin tower, 64: decomposition apparatus, 72, 73, 74, 83 and 94: injection pipe, 76: pH meter, 85: iron (II) ion injection apparatus, 86: oxidizing agent injection apparatus, 87: pH adjustment agent injection apparatus, 88: chromium ion injection apparatus, 93: chemical solution injection apparatus.

What is claimed is:

1. In a plant having a structural member, a method of forming a ferrite film on a surface of the structural member comprising:

contacting said surface of said structural member with a film formation solution having a pH adjusted within a range of 5.5 to 9.0 including chromium ions, iron (II) ions, an oxidizing agent, and a pH adjustment agent, thereby forming a $Fe_{3-x}Cr_xO_4$ film on said surface of said structural member, wherein the chromium ions and the iron (II) ions are injected and mixed in the film formation solution before the film formation solution makes contact with said surface of said structural member, wherein $0<X\leq 0.1$ and wherein a temperature of the film formation solution is adjusted to 60° C. to 100° C.

2. The method of forming said ferrite film on said structural member according to claim 1, wherein a concentration of said pH adjustment agent included in said film formation solution is adjusted to larger than 100 ppm and smaller than 50000 ppm.

3. The method of forming said ferrite film on said structural member according to claim 2, wherein said concentration of said pH adjustment agent included in said film formation solution is adjusted to 10000 to 40000 ppm.

4. The method of forming said ferrite film on said structural member according to claim 1, wherein said step of contacting said film formation solution with said surface of said structural member and said step of forming said $Fe_{3-x}Cr_xO_4$ film are executed after stopping operation of said plant having said structural member and before restarting operation of said plant.

5. The method of forming said ferrite film on said structural member according to claim 4, wherein said step of contacting said film formation solution with said surface is executed after executing chemical decontamination of said surface of said structural member.

6. The method of forming said ferrite film on said structural member according to claim 1, wherein said step of contacting said film formation solution with said surface of said structural member and said step of forming said $Fe_{3-x}Cr_xO_4$ film on said surface are executed after completing installation of said plant having said structural member and before starting a first trial operation of said plant.

7. In a plant having a structural member, a method of forming a ferrite film on a surface of the structural member comprising:

connecting a pipe having a heater to a piping that is said structural member;

supplying a film formation solution with a pH adjusted within a range of 5.5 to 9.0 including chromium ions, iron (II) ions, an oxidizing agent, and a pH adjustment agent to said piping through said pipe;

contacting said inner surface of said piping with the film formation solution, thereby forming a $Fe_{3-x}Cr_xO_4$ film on said inner surface, wherein the chromium ions and the iron (II) ions are injected and mixed in the film formation solution before the film formation solution makes contact with said surface of said structural member, wherein $0<X\leq 0.1$ and wherein a temperature of the film formation solution is adjusted to 60° C. to 100° C.

8. The method of forming said ferrite film on said structural member according to claim 7, wherein a closed loop is formed by said piping and said pipe; and said film formation solution circulates in said closed loop.

9. The method of forming said ferrite film on said structural member according to claim 8, wherein said film formation solution with said pH adjusted within said range of 5.5 to 9.0 including said chromium ions, said iron (II) ions, said oxidizing agent, and said pH adjustment agent is injected into said pipe from an injection apparatus.

10. The method of forming said ferrite film on said structural member according to claim 7, wherein a first chemical including said chromium ions and a carboxylic acid is injected into said pipe from a first injection apparatus; a second chemical including said iron (II) ions and said carboxylic acid is injected into said pipe from a second injection apparatus; said oxidizing agent is injected into said pipe from a third injection apparatus; and said pH adjustment agent is injected into said pipe from a fourth injection apparatus.

11. The method of forming said ferrite film on said structural member according to claim 10, wherein said carboxylic acid is formic acid.

12. The method of forming said ferrite film on said structural member according to claim 10, wherein said film formation solution with said pH adjusted within said range of 5.5 to 9.0 including said chromium ions, said iron (II) ions, said oxidizing agent, and said pH adjustment agent is injected into said pipe from an injection apparatus.

13. The method of forming said ferrite film on said structural member according to claim 7, wherein said film formation solution with said pH adjusted within a range of 5.5 to 9.0 including said chromium ions, said iron (II) ions, said oxidizing agent, and said pH adjustment agent is injected into said pipe from an injection apparatus.

14. The method of forming said ferrite film on said structural member according to claim 7, wherein a concentration of said pH adjustment agent included in said film formation solution supplied to said piping is adjusted to larger than 100 ppm and smaller than 50000 ppm.

15. The method of forming said ferrite film on said structural member according to claim 14, wherein said concentration of said pH adjustment agent included in said film formation solution is adjusted to 10000 to 40000 ppm.

16. The method of forming said ferrite film on said structural member according to claim 7, wherein said step of contacting said film formation solution with said inner surface of said piping and said step of forming said $Fe_{3-x}Cr_xO_4$ film on said inner surface are executed after stopping operation of said plant having said piping and before restarting operation of said plant.

17. The method of forming said ferrite film on said structural member according to claim 16, wherein said step of contacting said film formation solution with said inner surface of said piping is executed after executing chemical decontamination of said inner surface of said piping.

18. The method of forming said ferrite film on said structural member according to claim 7, wherein said step of contacting said film formation solution with said inner surface of said piping and said step of forming said $Fe_{3-x}Cr_xO_4$ film on said inner surface are executed after completing installation of said plant having said piping and before starting a first trial operation of said plant.

19. The method of forming said ferrite film on said structural member according to claim 7, wherein said piping is either made of stainless steel or made of carbon steel.

* * * * *